(12) United States Patent
Huo et al.

(10) Patent No.: US 12,219,175 B2
(45) Date of Patent: Feb. 4, 2025

(54) TRANSFORMATION METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Junyan Huo, Dongguan (CN); Xinwei Li, Dongguan (CN); Wenhan Qiao, Dongguan (CN); Yanzhuo Ma, Dongguan (CN); Shuai Wan, Dongguan (CN); Fuzheng Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 292 days.

(21) Appl. No.: 17/842,995

(22) Filed: Jun. 17, 2022

(65) Prior Publication Data

US 2022/0329862 A1 Oct. 13, 2022

Related U.S. Application Data

(63) Continuation of application No. PCT/CN2019/130157, filed on Dec. 30, 2019.

(51) Int. Cl.
*H04N 19/61* (2014.01)
*H04N 19/176* (2014.01)
(Continued)

(52) U.S. Cl.
CPC .......... *H04N 19/61* (2014.11); *H04N 19/176* (2014.11); *H04N 19/593* (2014.11); *H04N 19/70* (2014.11)

(58) Field of Classification Search
CPC .... H04N 19/61; H04N 19/176; H04N 19/593; H04N 19/70; H04N 19/159; H04N 19/12
See application file for complete search history.

(56) References Cited

U.S. PATENT DOCUMENTS

2019/0306526 A1 10/2019 Cho et al.

FOREIGN PATENT DOCUMENTS

| CN | 106254883 A | 12/2016 |
| CN | 107925763 A | 4/2018 |
| CN | 109076243 A | 12/2018 |

OTHER PUBLICATIONS

Chosun University and Humax "Non-CE6: Simplification of LFNST LUT" JVET-P0313; JVET of ITU-T SG 16 WP 3 and ISO/IEC JTC 1/SC 29/WG 11; 16th Meeting: Geneva, CH; Oct. 1-11, 2019. 3 pages.

(Continued)

*Primary Examiner* — Joseph W Becker
(74) *Attorney, Agent, or Firm* — PERKINS COIE LLP

(57) ABSTRACT

Disclosed are a transformation method, an encoder, a decoder, and a storage medium. The transformation method applied to an encoder includes: determining a prediction mode parameter of a current block; determining a Matrix-based Intra Prediction (MIP) parameter when the prediction mode parameter indicates that MIP is used for the current block to determine an intra prediction value; determining an intra prediction value of the current block according to the MIP parameter and calculating a residual value between the current block and the intra prediction value; determining a Low-Frequency Non-Separable Transform (LFNST) transform kernel used for the current block according to the MIP parameter when an LFNST is used for the current block, setting an LFNST index, and signalling the LFNST index in (Continued)

a video bitstream; and performing a transform processing on the residual value by using the LFNST transform kernel.

12 Claims, 6 Drawing Sheets

(51) Int. Cl.
*H04N 19/593* (2014.01)
*H04N 19/70* (2014.01)

(56) References Cited

OTHER PUBLICATIONS

Extended European Search Report for European Application No. 19958505.0 issued Jan. 3, 2023. 8 pages.
InterDigital "CE6 Related: MIP Adaptation on Top of CE6-1.1d" JVET-P0349; JVET of ITU-T SG 16 WP 3 and ISO/IEC JTC 1/SC 29/WG 11; 16th Meeting; Geneva, CH; Oct. 1-11, 2019. 4 pages.
International Search Report Mailed Sep. 27, 2020 In Application No. PCT/CN2019/130157.
Koo et al., CE6: Reduced Secondary Transform (Rst) (CE6-3.1), Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0193, 19 pages.
Pfaff et al., CE3: Affine linear weighted intra prediction (CE3-4.1, CE3-4.2), Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0217, 17 pages.
Pfaff et al., Non-CE3: Harmonization of 8-Bit MIP with Unified-MPM and LFNST, Joint Video Experts Team (JVET) of ITU-T SG 16 WP 3 and ISO/IEC JTC 1/SC 29/WG 11, 15th Meeting: Gothenburg, SWE, Jul. 3-12, 2019, Document: JVET-O0485-r2, 4 pages.
Naser et al., Non-CE6 Interaction between Implicit MTS and LFNST and MIP, Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0529, 6 pages.
Bross et al., Versatile Video Coding (Draft 7), Joint Video Experts Team (JVET) of ITU-T SG 16 WP 3 and ISO/IEC ITC 1/SC 29/WG 11, 16th Meeting: Geneva, CH, Oct. 1-11, 2019, Document: JVET-P2001-vE, 494 pages.
ITU-T H.265 Telecommunication Standardization Sector of ITU (Apr. 2013) Series H: Audiovisual and Multimedia Systems, Infrastructure of audiovisual services—Coding of moving video, High efficiency video coding, 317 pages.
ITU-T H.265 Telecommunication Standardization Sector of ITU (Oct. 2014) Series H: Audiovisual and Multimedia Systems, Infrastructure of audiovisual services—Coding of moving video, High efficiency video coding, 540 pages.
ITU-T H.265 Telecommunication Standardization Sector of ITU (Apr. 2015) Series H: Audiovisual and Multimedia Systems, Infrastructure of audiovisual services—Coding of moving video, High efficiency video coding, 634 pages.
ITU-T H.265 Telecommunication Standardization Sector of ITU (Dec. 2016) Series H: Audiovisual and Multimedia Systems, Infrastructure of audiovisual services—Coding of moving video, High efficiency video coding, 664 pages.
ITU-T H.265 Telecommunication Standardization Sector of ITU (Feb. 2018) Series H: Audiovisual and Multimedia Systems, Infrastructure of audiovisual services—Coding of moving video, High efficiency video coding, 692 pages.
ITU-T H.265 Telecommunication Standardization Sector of ITU (Jun. 2019) Series H: Audiovisual and Multimedia Systems, Infrastructure of audiovisual services—Coding of moving video, High efficiency video coding, 696 pages.
ITU-T H.265 Telecommunication Standardization Sector of ITU (Nov. 2019) Series H: Audiovisual and Multimedia Systems, Infrastructure of audiovisual services—Coding of moving video, High efficiency video coding, 712 pages.
ITU-T H.265 Telecommunication Standardization Sector of ITU (Aug. 2021) Series H: Audiovisual and Multimedia Systems, Infrastructure of audiovisual services—Coding of moving video, High efficiency video coding, 716 pages.
ITU-T H.266 Telecommunication Standardization Sector of ITU (Aug. 2020) Series H: Audiovisual and Multimedia Systems, Infrastructure of audiovisual services—Coding of moving video, Versatile video coding, 516 pages.
Written Opinion Mailed Sep. 27, 2020 in Application No. PCT/CN2019/130157, 7 pages.

TRANSFORMATION METHOD, ENCODER, DECODER, AND STORAGE MEDIUM

CROSS-REFERENCE TO RELATED APPLICATION

The present application is a continuation application of the International PCT Application No. PCT/CN2019/130157, having an international filing date of Dec. 30, 2019, the entire content of which is hereby incorporated by reference.

TECHNICAL FIELD

Embodiments of the present application relate to the technical field of picture processing, and more particularly, to a transform method, an encoder, a decoder, and a storage medium.

BACKGROUND

With improvement of people's requirements on video display quality, new video application forms such as high-definition and ultra-high-definition videos have emerged. H.265/High Efficiency Video Coding (HEVC) has become unable to meet requirements of rapid development of video applications. The Joint Video Exploration Team (JVET) puts forward the next generation video coding standard H.266/Versatile Video Coding (VVC), and a corresponding test model of which is a VVC Test Model (VTM).

In H.266/VVC, a Reduced Second Transform (RST) technology has been currently accepted and renamed as a Low-Frequency Non-Separable Transform (LFNST) technology. Since selection of a transform set in the LFNST technology is based on an intra prediction mode, while for a non-traditional intra prediction mode, lack of variability in an LFNST transform reduces an encoding efficiency.

SUMMARY

The embodiments of the present application provides a transform method, an encoder, a decoder, and a storage medium, which may improve applicability of the LFNST technology to a non-traditional intra prediction mode, enable a more flexible selection of a transform set, and thus can improve encoding and decoding efficiencies.

Technical solutions of the embodiments of the present application may be implemented as follows.

In a first aspect, an embodiment of the present application provides a transform method, which is applied to an encoder, the method includes: determining a prediction mode parameter of a current block; determining a Matrix-based Intra Prediction (MIP) parameter when the prediction mode parameter indicates that MIP is used for the current block to determine an intra prediction value; determining an intra prediction value of the current block according to the MIP parameter and calculating a residual value between the current block and the intra prediction value; determining a Low-Frequency Non-Separable Transform (LFNST) transform kernel used for the current block according to the MIP parameter when an LFNST is used for the current block, setting an LFNST index, and signalling the LFNST index in a video bitstream; and performing a transform processing on the residual value by using the LFNST transform kernel.

In a second aspect, an embodiment of the present application provides a transform method, which is applied to a decoder, the method includes: parsing a bitstream and determining a prediction mode parameter of a current block; parsing the bitstream and determining a Matrix-based Intra Prediction (MIP) parameter when the prediction mode parameter indicates that MIP is used for the current block to determine an intra prediction value; parsing the bitstream and determining a Low-Frequency Non-Separable Transform (LFNST) index and a transform coefficient of the current block; determining an LFNST transform kernel used for the current block according to the MIP parameter when the LFNST index indicates that an LFNST is used for the current block; and performing a transform processing on the transform coefficient by using the LFNST transform kernel.

In a third aspect, an embodiment of the present application provides a encoder including a first determination unit, a first calculation unit, and a first transform unit, wherein the first determination unit is configured to determine a prediction mode parameter of a current block; the first determination unit is further configured to determine a Matrix-based Intra Prediction (MIP) parameter when the prediction mode parameter indicates that MIP is used for the current block to determine an intra prediction value; the first calculation unit is configured to determine an intra prediction value of the current block according to the MIP parameter and calculate a residual value between the current block and the intra prediction value; the first determination unit is further configured to determine a Low-Frequency Non-Separable Transform (LFNST) transform kernel used for the current block according to the MIP parameter when an LFNST is used for the current block, set an LFNST index and signal the LFNST index in a video bitstream; and the first transform unit is configured to perform a transform processing on the residual value by using the LFNST transform kernel.

In a fourth aspect, an embodiment of the present application provides an encoder including a first memory and a first processor, wherein the first memory is configured to store a computer program runnable on the first processor, and the first processor is configured to perform the method according to the first aspect when running the computer program.

In a fifth aspect, an embodiment of the present application provides a decoder including a parsing unit, a second determination unit, and a second transform unit, wherein the parsing unit is configured to parse a bitstream and determine a prediction mode parameter of a current block, and is further configured to parse the bitstream and determine a Matrix-based Intra Prediction (MIP) parameter when the prediction mode parameter indicates that MIP is used for the current block to determine an intra prediction value, and is further configured to parse the bitstream and determine a Low-Frequency Non-Separable Transform (LFNST) index and a transform coefficient of the current block; the second determination unit is configured to determine an LFNST transform kernel used for the current block according to the MIP parameter when the LFNST index indicates that an LFNST is used for the current block; and the second transform unit is configured to perform a transform processing on the transform coefficient by using the LFNST transform kernel.

In a sixth aspect, an embodiment of the present application provides a decoder including a second memory and a second processor, wherein the second memory is configured to store a computer program runnable on the second processor, and the second processor is configured to perform the method according to the second aspect when running the computer program.

In a seventh aspect, an embodiment of the present application provides a computer storage medium in which a computer program is stored, wherein when the computer program is executed by a first processor, the method according to the first aspect is implemented, or when the computer program is executed by a second processor, the method according to the second aspect is implemented.

The embodiments of the present application provide a transform method, an encoder, a decoder, and a storage medium. A prediction mode parameter of a current block is determined; a Matrix-based Intra Prediction (MIP) parameter is determined when the prediction mode parameter indicates that MIP is used for the current block to determine an intra prediction value; the intra prediction value of the current block is determined according to the MIP parameter, and a residual value between the current block and the intra prediction value is calculated; when a Low-Frequency Non-Separable Transform (LFNST) is used for the current block, an LFNST transform kernel used for the current block is determined according to the MIP parameter, an LFNST index is set and signalled in a video bitstream; and a transform processing is performed on the residual value by using the LFNST transform kernel. In this way, for the current block using the MIP mode, the MIP parameter is introduced during an LFNST transform, which makes selection of the LFNST transform kernel more flexible, thus not only applicability of the LFNST technology to a non-traditional intra prediction mode is improved, but also encoding and decoding efficiencies are improved, and at the same time, video picture quality can also be improved.

DETAILED DESCRIPTION

In order to understand features and technical contents of embodiments of the present application in more detail, implementations of the embodiments of the present application will be described in detail below with reference to accompanying drawings, which are for reference only and are not intended to limit the embodiments of the present application.

In a video picture, a Coding Block (CB) is generally characterized by a first colour component, a second colour component, and a third colour component. The three colour components are respectively a luma component, a blue chroma component, and a red chroma component. Specifically, the luma component is usually represented by a symbol Y, the blue chroma component is usually represented by a symbol Cb or U, and the red chroma component is usually represented by a symbol Cr or V. In this way, the video picture may be represented in a format of YCbCr or a format of YUV.

In an embodiment of the present application, the first colour component may be a luma component, the second colour component may be a blue chroma component, and the third colour component may be a red chroma component, which is not specifically limited in the embodiments of the present application.

Related technical solutions of a current LFNST technology will be described in the following.

Figure 1:
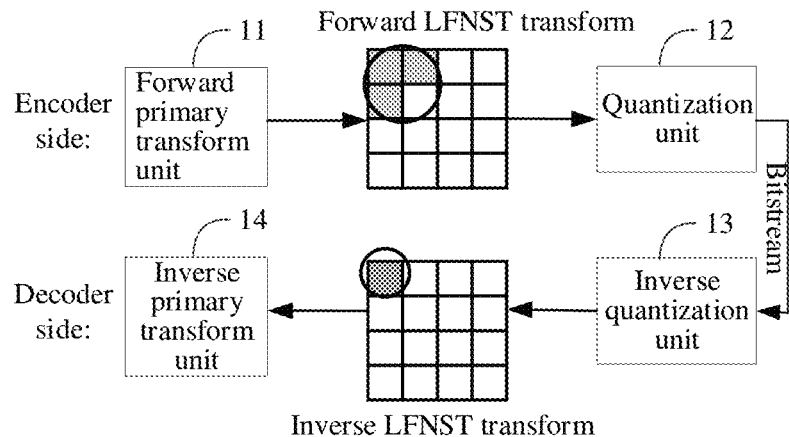
FIG. 1 is a schematic diagram of an application position of an LFNST technology according to a related technical solution.

Referring to FIG. 1, FIG. 1 shows a schematic diagram of an application position of an LFNST technology according to a related technical solution. As shown in FIG. 1, in an intra prediction mode, for an encoder side, the LFNST technology is applied between a forward primary transform unit 11 and a quantization unit 12, and the LFNST technology is applied between an inverse quantization unit 13 and an inverse primary transform unit 14.

Specifically, on the encoder side, firstly, for data, such as a residual, a first transform (which may be called "Core Transform" or "primary transform" or "main transform") is performed by the forward primary transform unit 11 to obtain a transform coefficient matrix after the first transform. Then, an LFNST transform (which may be called "Secondary Transform" or "second transform") is performed on coefficients in the transform coefficient matrix to obtain an LFNST transform coefficient matrix. Finally, the LFNST transform coefficient matrix is quantized by the quantization unit 12, and final quantized values are signalled in a video bitstream.

On a decoder side, the quantized values of the LFNST transform coefficient matrix may be obtained by parsing the bitstream, and an inverse quantization processing (which may be called "Scaling") is performed on the quantized values by the inverse quantization unit 13 to obtain restored values of the LFNST transform coefficient matrix, and an inverse LFNST transform is performed on the restored values and a coefficient matrix may be obtained. Then, an inverse transform corresponding to the "Core Transform" of the encoder side is performed on the coefficient matrix by the inverse primary transform unit 14, and finally a restored value of a residual is obtained. It should be noted that only an "inverse transform" operation on the decoder side is defined in the standard, so an "inverse LFNST transform" in the standard is also called an "LFNST transform". Here, in order to distinguish it from a transform on the encoder side, an "LFNST transform" on the encoder side may be called a "forward LFNST transform" and an "LFNST transform" on the decoder side may be called an "inverse LFNST transform".

That is to say, on the encoder side, a residual of a current transform unit is subjected to a forward primary transform and primary transform coefficients may be obtained, then part of the primary transform coefficients are subjected to a second transform through matrix multiplication to obtain fewer and more concentrated secondary transform coefficients, which are then quantized. On the decoder side, after the quantized values are obtained by parsing, an inverse quantization processing is performed on the quantized values, an inverse second transform is performed on coefficients after inverse quantization through matrix multiplication, and then an inverse primary transform is performed on coefficients after the inverse second transform, so as to recover the residual.

In the LFNST technology, an LFNST transform process may include following acts: configuring a core parameter, an intra prediction mode mapping, selecting a transform matrix, calculating matrix multiplication, and constructing an inverse primary transform coefficient matrix, etc. After these acts, it indicates that an LFNST transform is completed. However, in the act of selecting the transform matrix, a transform set needs to be selected first. Since the transform matrix is related to directional characteristics of a prediction mode, the transform set is currently selected according to an intra prediction mode. Herein, for a traditional intra prediction mode, a value of an indicator of the intra prediction mode (which may be represented by predModeIntra) may be determined according to a number of the traditional intra prediction mode, and then a transform set index may be determined according to the value of predModeIntra. However, for a non-traditional intra prediction mode, especially a Matrix-based Intra Prediction (MIP) mode, the value of predModeIntra is directly set as an index corresponding to an intra prediction mode (i.e. 0) indicating a PLANAR mode, so that in a MIP mode, a transform set whose transform set index is 0 may only be selected for a current block. Therefore, an LFNST transform using the current block in the MIP mode lacks variability, which results in that the LFNST technology cannot be well suited for the MIP mode, and also reduces an encoding efficiency.

An embodiment of the present application provides a transform method, which is applied to an encoder. A prediction mode parameter of a current block is determined; a Matrix-based Intra Prediction (MIP) parameter is determined when the prediction mode parameter indicates that MIP is used for the current block to determine an intra prediction value; the intra prediction value of the current block is determined according to the MIP parameter, and a residual value between the current block and the intra prediction value is calculated; when a Low-Frequency Non-Separable Transform (LFNST) is used for the current block, an LFNST transform kernel used for the current block is determined according to the MIP parameter, an LFNST index is set and signalled in a video bitstream; and a transform processing is performed on the residual value by using the LFNST transform kernel. In this way, for the current block using the MIP mode, the MIP parameter is introduced during an LFNST transform, which makes selection of the LFNST transform kernel more flexible, thus not only applicability of the LFNST technology to a non-traditional intra prediction mode is improved, but also encoding and decoding efficiencies are improved, and at the same time, video picture quality can also be improved.

Various embodiments of the present application will be described in detail below with reference to the accompanying drawings.

Figure 2A:
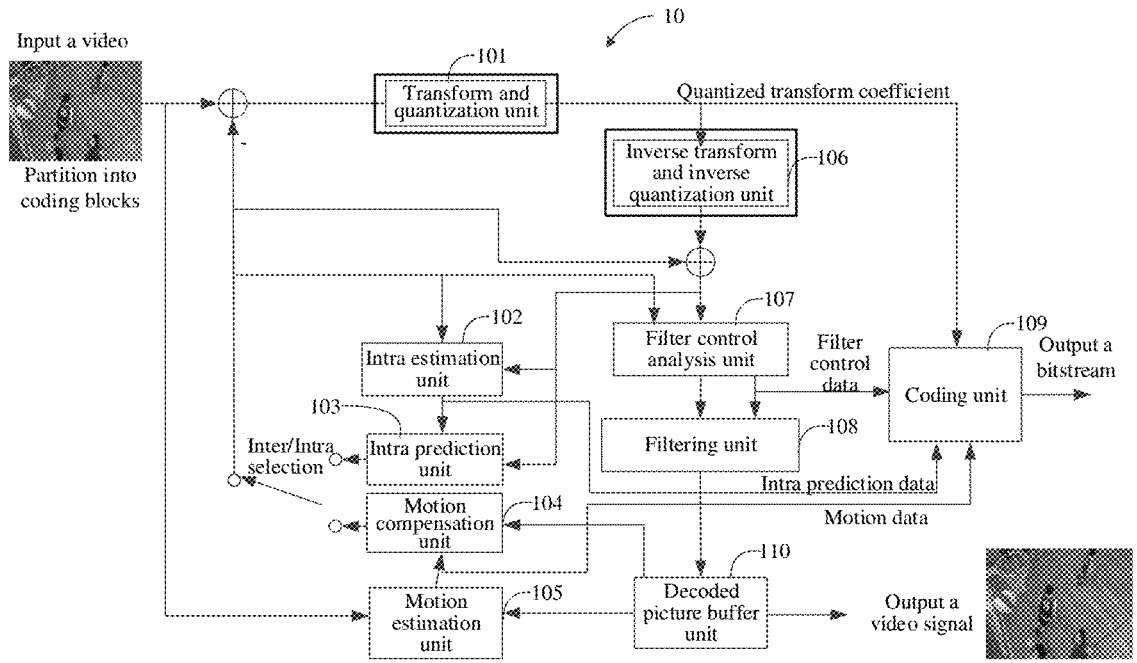
FIG. 2A is a block diagram of a composition of a video encoding system according to an embodiment of the present application.

Referring to FIG. 2A, it shows an example of a block diagram of a composition of a video encoding system according to an embodiment of the present application. As shown in FIG. 2A, the video encoding system 10 includes: a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, a coding unit 109, and a decoded picture buffer unit 110, etc. Herein, the filtering unit 108 may implement deblocking filtering and Sample Adaptive Offset (SAO) filtering, and the coding unit 109 may implement header information coding and Context-based Adaptive Binary Arithmetic Coding (CABAC). For an input original video signal, a video coding block may be obtained by partitioning a Coding Tree Unit (CTU), and then for residual pixel information obtained after intra or inter prediction, the video coding block is transformed through the transform and quantization unit 101, including transforming residual information from a pixel domain to a transform domain, and quantizing an obtained transform coefficient to further reduce a bit rate. The intra estimation unit 102 and the intra prediction unit 103 are used for intra prediction of the video coding block. In particular, the intra estimation unit 102 and the intra prediction unit 103 are used for determining an intra prediction mode to be used for encoding the video coding block. The motion compensation unit 104 and the motion estimation unit 105 are used for performing inter prediction coding of a received video coding block with respect to one or more blocks in one or more reference frames to provide temporal prediction information. Motion estimation performed by the motion estimation unit 105 is a process of generating a motion vector that may be used for estimating motion of the video coding block, and then the motion compensation unit 104 performs motion compensation based on the motion vector determined by the motion estimation unit 105. After determining the intra prediction mode, the intra prediction unit 103 is further used for providing selected intra prediction data for the coding unit 109, and the motion estimation unit 105 also sends data of the calculated and determined motion vector to the coding unit 109. In addition, the inverse transform and inverse quantization unit 106 is used for reconstructing the video coding block, a residual block is reconstructed in the pixel domain, blocking effect artifacts are removed from the reconstructed residual block through the filter control analysis unit 107 and the filtering unit 108, and then the reconstructed residual block is added to a predictive block in a frame of the decoded picture buffer unit 110 to generate a reconstructed video coding block. The coding unit 109 is used for encoding various coding parameters and quantized transform coefficients, in a CABAC-based coding algorithm, context contents may be based on adjacent coding blocks, and may be used for encoding information indicating a determined intra prediction mode and outputting a bit-stream of the video signal. The decoded picture buffer unit 110 is used for storing a reconstructed video coding block for prediction reference. As the encoding of the video picture proceeds, new reconstructed video coding blocks will be generated continuously, and these reconstructed video coding blocks will all be stored in the decoded picture buffer unit 110.

Figure 2B:
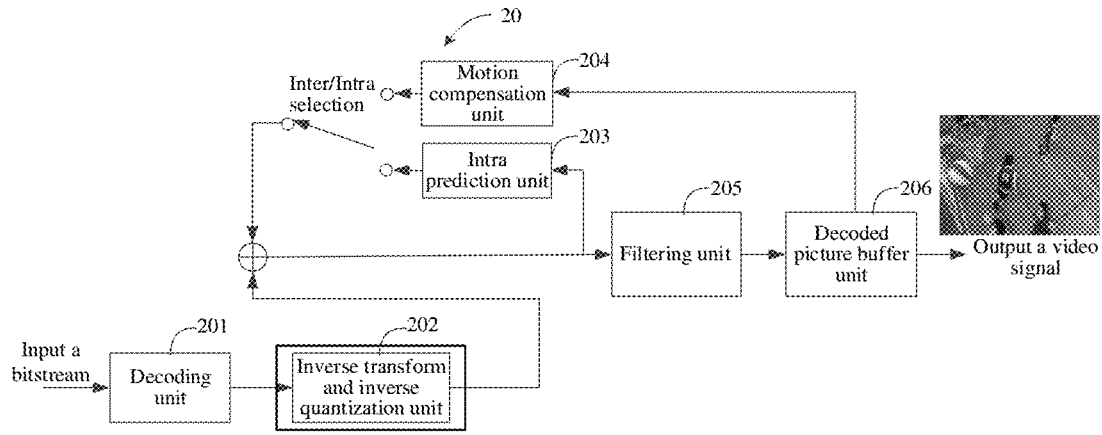
FIG. 2B is a block diagram of a composition of a video decoding system according to an embodiment of the present application.

Referring to FIG. 2B, it shows an example of a block diagram of a composition of a video decoding system according to an embodiment of the present application. As shown in FIG. 2B, the video decoding system 20 includes a decoding unit 201, an inverse transform and inverse quantization unit 202, an intra prediction unit 203, a motion compensation unit 204, a filtering unit 205, and a decoded picture buffer unit 206, etc. Herein, the decoding unit 201 may implement header information decoding and CABAC decoding, and the filtering unit 205 may implement deblocking filtering and SAO filtering. After an input video signal is subjected to the encoding processing in FIG. 2A, a bitstream of the video signal is output. The bitstream is input into the video decoding system 20, it first passes through the decoding unit 201 to obtain a transform coefficient after decoding. The transform coefficient is processed through the inverse transform and inverse quantization unit 202 to generate a residual block in the pixel domain. The intra prediction unit 203 may be used for generating prediction data of a current video coding block based on the determined intra prediction mode and data from a previous coding block of a current frame or picture. The motion compensation unit 204 determines prediction information for the video coding block by analyzing a motion vector and another related syntax element, and uses the prediction information to generate a predictive block of the video coding block being decoded. A decoded video block is formed by summing the residual block from the inverse transform and inverse quantization unit 202 and a corresponding predictive block generated by the intra prediction unit 203 or the motion compensation unit 204. The decoded video signal passes through the filtering unit 205 to remove blocking effect artifacts, which may improve video quality. Then, the decoded video block is stored in the decoded picture buffer unit 206, the decoded picture buffer unit 206 stores a reference picture for subsequent intra prediction or motion compensation, and is also used for outputting a video signal, thus a restored original video signal is obtained.

The transform method in the embodiment of the present application may be applied to a part of the transform and quantization unit 101 as shown in FIG. 2A, and the transform and quantization unit 101 includes the forward primary transform unit 11 and the quantization unit 12 as shown in FIG. 1. At this time, the transform method is specifically applied to a part between transform and quantization. In addition, the transform method in the embodiment of the present application may also be applied to a part of the inverse transform and inverse quantization unit 106 as shown in FIG. 2A or a part of the inverse transform and inverse quantization unit 202 as shown in FIG. 2B. Each of the inverse transform and inverse quantization unit 106 and the inverse transform and inverse quantization unit 202 may include the inverse quantization unit 13 and the inverse primary transform unit 14 as shown in FIG. 1. At this time, the transform method is specifically applied to a part between inverse quantization and inverse transform. That is to say, the transform method in the embodiment of the present application may be applied to the video encoding system or the video decoding system, or may even be applied to the video encoding system and the video decoding system at the same time, which is not specifically limited in the embodiment of the present application. It should also be noted that when the transform method is applied to the video encoding system, a "current block" specifically refers to a current coding block in intra prediction. When the transform method is applied to the video decoding system, a "current block" specifically refers to a current coding block in intra prediction.

Figure 3:
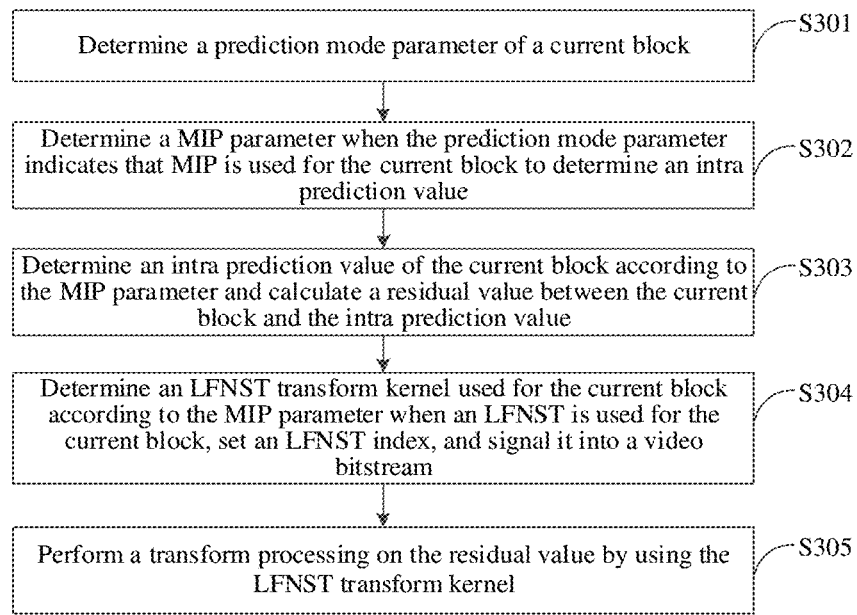
FIG. 3 is a schematic flowchart of a transform method according to an embodiment of the present application.

Based on the example of application scenario of FIG. 2A above, referring to FIG. 3, it shows a schematic flowchart of a transform method according to an embodiment of the present application. As shown in FIG. 3, the method may include following acts.

S301: determining a prediction mode parameter of a current block.

It should be noted that a video picture may be partitioned into multiple picture blocks, and each picture block currently to be encoded may be called a Coding Block (CB). Here, each coding block may include a first colour component, a second colour component, and a third colour component. The current block is a coding block whose first colour component, second colour component, or third colour component is currently to be predicted, in the video picture.

Herein, it is assumed that a first colour component is predicted for a current block, and the first colour component is a luma component, that is, a colour component to be predicted is a luma component, and then the current block may also be called a luma block. Or, it is assumed that a second colour component is predicted for a current block, and the second colour component is a chroma component, that is, a colour component to be predicted is a chroma component, then the current block may also be called a chroma block.

It should also be noted that the prediction mode parameter indicates a coding mode of the current block and a parameter related to the mode. Rate Distortion Optimization (RDO) may usually be used for determining the prediction mode parameter of the current block.

Specifically, in some embodiments, for S301, the determining the prediction mode parameter of the current block may include: determining a colour component to be predicted of the current block; performing prediction coding on the colour component to be predicted by using multiple prediction modes respectively based on a parameter of the current block, and calculating a rate distortion cost result corresponding to each prediction mode in the multiple prediction modes; selecting a minimum rate distortion cost result from multiple calculated rate distortion cost results, and determining a prediction mode corresponding to the minimum rate distortion cost result as the prediction mode parameter of the current block.

That is to say, on an encoder side, for a current block, multiple prediction modes may be used for encoding a colour component to be predicted respectively. Here, the multiple prediction modes usually include a traditional intra prediction mode and a non-traditional intra prediction mode, while the traditional intra prediction mode may include a Direct Current (DC) mode, a PLANAR mode, and an angular mode, etc. The non-traditional intra prediction mode may include a MIP mode, a Cross-component Linear Model Prediction (CCLM) mode, an Intra Block Copy (IBC) mode, and a Palette (PLT) mode, etc.

Then after a current block is encoded by using multiple prediction modes, a rate distortion cost result corresponding to each prediction mode may be obtained. Then the minimum rate distortion cost result is selected from the obtained multiple rate distortion cost results, and a prediction mode corresponding to the minimum rate distortion cost result is determined as a prediction mode parameter of the current block. In this way, the current block may be encoded by using the determined prediction mode, and in this prediction mode, a residual may be made small and an encoding efficiency may be improved.

S302: determining a MIP parameter when the prediction mode parameter indicates that MIP is used for the current block to determine an intra prediction value.

S303: determining an intra prediction value of the current block according to the MIP parameter and calculating a residual value between the current block and the intra prediction value.

It should be noted that for a MIP mode, input data of MIP prediction includes: a position of the current block (xTbCmp, yTbCmp), a MIP prediction mode applied to the current block (which may be represented by modeId), a height of the current block (represented by nTbH), a width of the current block (represented by nTbW), and a transposition processing indication flag (which may be represented by isTransposed) for whether it needs to be transposed, etc. Output data of MIP prediction includes a prediction block of the current block, an intra prediction value corresponding to a pixel coordinate [x][y] in the prediction block is predSamples [x][y]; wherein x=0, 1, . . . , nTbW−1; y=0, 1, . . . , nTbH−1.

Figure 4:
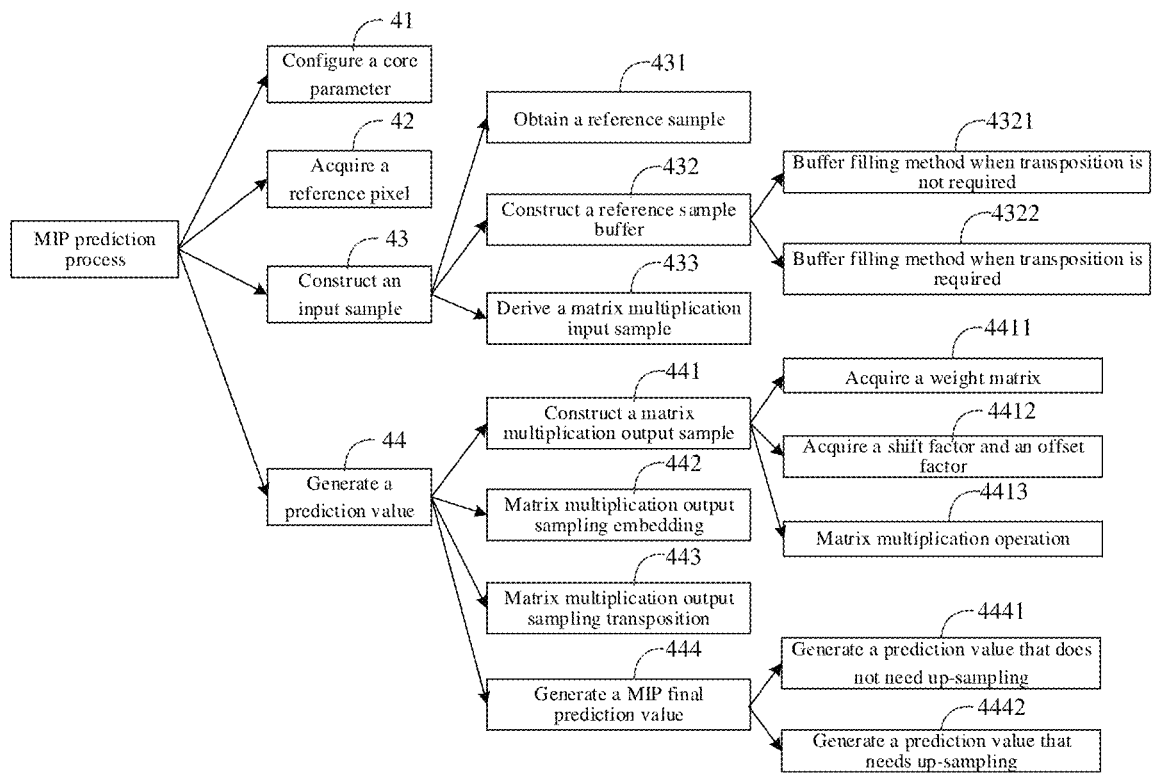
FIG. 4 is a flow block diagram of a MIP prediction process according to an embodiment of the present application.

Specifically, as shown in FIG. 4, a MIP prediction process may be divided into four acts: configuring a core parameter 41, acquiring a reference pixel 42, constructing an input sample 43, and generating a prediction value 44. Herein, for the configuring the core parameter 41, the current block may be partitioned into three types according to a size of a current block in a frame, and a type of the current block may be recorded by mipSizeId. Moreover, for different types of current blocks, a quantity of reference samples and a quantity of output samples of matrix multiplication are different. For the acquiring the reference pixel 42, when a current block is predicted, an upper block and a left block of the current block are both blocks that have been encoded, and reference pixels of the MIP technology are reconstructed values of an upper row of pixels and a left column of pixels of the current block. A process of acquiring reference pixels adjacent to an upper side (indicated by refT) and reference pixels adjacent to a left side (indicated by refL) of the current block is an acquisition process of reference pixels. For constructing the input sample 43, this act is used for an input of matrix multiplication, and may mainly include: obtaining a reference sample 431, constructing a reference sample buffer 432, and deriving a matrix multiplication input sample 433; wherein a process of obtaining the reference sample is a down-sampling process, and the constructing the reference sample buffer 432 may include a buffer filling method 4321 when transposition is not required and a buffer filling method 4322 when transposition is required. For the generating the prediction value 44, this act is used for acquiring a MIP prediction value of the current block, which mainly includes: constructing a matrix multiplication output sampling block 441, matrix multiplication output sampling embedding 442, matrix multiplication output sampling transposition 443, and generating a MIP final prediction value 444, wherein the constructing the matrix multiplication output sampling block 441 may include acquiring a weight matrix 4411, acquiring a shift factor and an offset factor 4412, and a matrix multiplication operation 4413, and the generating the MIP final prediction value 444 may include generating a prediction value 4441 that does not need up-sampling and generating a prediction value 4442 that needs up-sampling. In this way, after these four acts, the intra prediction value of the current block may be obtained.

In this way, after the intra prediction value of the current block is determined, a difference may be calculated according to a real pixel value of the current block and the intra prediction value, and the calculated difference may be used as a residual, which facilitates subsequent transform processing on the residual.

Further, in the MIP prediction process, a MIP parameter also needs to be determined.

In some embodiments, the MIP parameter may include a MIP transposition indication parameter (which may be represented by isTransposed). Here, a value of the MIP transposition indication parameter is used for indicating whether to perform a transposition processing on a sample input vector used in the MIP mode.

Specifically, in the MIP mode, according to a reference sample value corresponding to an adjacent reference pixel on a left side of the current block and a reference sample value corresponding to an adjacent reference pixel on an upper side of the current block, an adjacent reference sample set may be obtained. In this way, after the adjacent reference sample set is obtained, an input reference sample value set, that is, a sample input vector used in the MIP mode, may be constructed at this time. However, for the construction of the input reference sample value set, a construction method on the encoder side and a construction method on the decoder side are different, mainly related to a value of the MIP transposition indication parameter.

When applied to the encoder side, the value of the MIP transposition indication parameter may still be determined by utilizing Rate Distortion Optimization, which may specifically include: calculating a first cost value with transposition and a second cost value without transposition; if the first cost value is less than the second cost value, in this case it may be determined that the value of the MIP transposition indication parameter is 1; and if the first cost value is not less than the second cost value, in this case it may be determined that the value of the MIP transposition indication parameter is 0.

Further, when the value of the MIP transposition indication parameter is 0, in a buffer, a reference sample value corresponding to an upper side in an adjacent reference sample set may be stored before a reference sample value corresponding to a left side, at this time, there is no need to perform a transposition processing, that is, there is no need to perform a transposition processing on a sample input vector used in a MIP mode, and the buffer may be directly determined as an input reference sample value set. When the value of the MIP transposition indication parameter is 1, in a buffer, a reference sample value corresponding to an upper side of an adjacent reference sample set may be stored after a reference sample value corresponding to a left side. That is, a sample input vector used in the MIP mode needs to be transposed, and then a transposed buffer is determined as an input reference sample value set. In this way, after the input reference sample value set is obtained, it may be used for a process of determining an intra prediction value corresponding to a current block in the MIP mode.

It should also be noted that, on the encoder side, after the value of the MIP transposition indication parameter is determined, the determined value of the MIP transposition indication parameter also needs to be signalled in a bitstream, which facilitates subsequent parsing processing on the decoder side.

In some embodiments, the MIP parameter may also include a MIP mode index (which may be represented by modeId), wherein the MIP mode index is used for indicating a MIP mode used for the current block, and the MIP mode is used for indicating a calculation and derivation method for determining an intra prediction value of the current block by using MIP.

That is to say, in the MIP mode, since there are many types of MIP modes, which may be distinguished through MIP mode indices, that is, different MIP modes have different MIP mode indices. In this way, according to the calculation and derivation method for determining the intra prediction value of the current block by using MIP, a specific MIP mode may be determined, so that a corresponding MIP mode index may be obtained. In the embodiment of the present application, a value of the MIP mode index may be 0, 1, 2, 3, 4, or 5.

In some embodiments, the MIP parameter may also include parameters such as a size and a width-to-height ratio of the current block; wherein, according to the size of the current block (that is, a width and a height of the current block), a category of the current block (which may be represented by mipSizeId) may also be determined.

In one implementation mode, the determining the category of the current block according to the size of the current block may include: a value of mipSizeId may be set to 0 if the width and the height of the current block are both equal to 4; conversely, the value of mipSizeId may be set to 1 if one of the width and the height of the current block is equal to 4, or the width and the height of the current block are both equal to 8; conversely, the value of mipSizeId may be set to 2 if the current block is a block of another size.

In another implementation mode, the determining the category of the current block according to the size of the current block may include: a value of mipSizeId may be set to 0 if the width and the height of the current block are both equal to 4; conversely, the value of mipSizeId may be set to 1 if one of the width and the height of the current block is equal to 4; conversely, the value of mipSizeId may be set to 2 if the current block is a block of another size.

In this way, in a process of determining an intra prediction value by using MIP, a MIP parameter may also be determined, which is convenient for determining an LFNST transform kernel (which may be represented by kernel) used for the current block according to the determined MIP parameter.

S304: determining an LFNST transform kernel used for the current block according to the MIP parameter when an LFNST is used for the current block, setting an LFNST index, and signalling it into a video bitstream.

It should be noted that an LFNST may not be executed for any current block. Only when the current block meets following conditions simultaneously, the LFNST may be performed on the current block. Herein, these conditions include: (a) a width and a height of the current block are both greater than or equal to 4; (b) the width and the height of the current block are both less than or equal to a maximum size of a transform unit; (c) a prediction mode of the current block or a coding block where the current block is located is an intra prediction mode; (d) a primary transform of the current block is a two-dimensional forward primary transform (DCT2) in both horizontal and vertical directions; (e) the intra prediction mode of the current block or a coding block where the current block is located is a non-MIP mode, or a prediction mode of a transform unit is a MIP mode and a width and a height of the transform unit are both greater than or equal to 16. That is to say, for the current block in the embodiment of the present application, the above five conditions need to be met at the same time.

Further, when it is determined that an LFNST may be executed for the current block, an LFNST transform kernel (which may be represented by kernel) used for the current block also needs to be determined at this time. The LFNST has four transform kernel candidate sets, which may include set0, set1, set2, and set3. According to a coding parameter of the current block or a coding block where the current block is located, a selected transform kernel candidate set may be implicitly derived. For example, in the current H.266/VVC, which of four transform kernel candidate sets is to be used may be determined according to an intra prediction mode of a current block.

Specifically, after the intra prediction mode of the current block is obtained, a value of an intra prediction mode indicator (which may be represented by predModeIntra) may be determined, and a calculation formula is as follows.

$$\text{predModeIntra} = (cIdx == 0)?\text{IntraPredModeY}[xTbY][yTbY]:\text{IntraPredModeC}[xTbY][yTbY] \quad (1)$$

Herein, a colour component indicator (which may be represented by cIdx) is used for indicating a luma component or a chroma component of the current block. Here, if what is predicted for the current block is a luma component, then cIdx is equal to 0; if what is predicted for the current block is a chroma component, then cIdx is equal to 1. In addition, (xTbY, yTbY) is a coordinate of a sample in an upper left corner of the current block, IntraPredModeY [xTbY][yTbY] is an intra prediction mode of a luma component, and IntraPredModeC [xTbY][yTbY] is an intra prediction mode of a chroma component.

In the current H.266/VVC, intra prediction modes may also be partitioned into a traditional intra prediction mode and a non-traditional intra prediction mode. For a non-traditional intra prediction mode, information indicated by a value of predModeIntra is as follows.

If a prediction mode of a current block is a CCLM mode, the value of predModeIntra may be INTRA_LT_CCLM, INTRA_L_CCLM, or INTRA_T_CCLM (which are 81, 82, 83 in VVC respectively); if the prediction mode of the current block is a MIP mode, the value of predModeIntra may be a MIP mode index used; if the prediction mode of the current block is a traditional intra prediction mode, the value of predModeIntra may be in [0, 66].

Further, if the prediction mode of the current block is a CCLM mode or a MIP mode, the value of predModeIntra may also be set in following manners.

(1) When the prediction mode of the current block is a CCLM mode, if a mode of a central luma block of a luma position corresponding to the current block (such as a chroma block) is a MIP mode, that is, intra_mip_flag [xTbY+nTbW/2][yTbY+nTbH/2] is 1, then the value of predModeIntra is set as an index (i.e. 0) indicating a PLANAR mode; otherwise, if the mode of the central luma block of the luma position corresponding to the current block (such as the chroma block) is an IBC mode or a PLT mode, the value of predModeIntra is set as an index (i.e. 1) indicating a DC mode; otherwise, the value of predModeIntra is set as a value IntraPredModeY[xTbY+nTbW/2][yTbY+nTbH/2] of a mode index of the central luma block of the luma position corresponding to the current block (such as the chroma block).

(2) When the prediction mode of the current block is a MIP mode, the value of predModeIntra may be directly set as an index (i.e. 0) indicating a PLANAR mode.

For a traditional intra prediction mode (such as wide-angle mapping), a wide-angle mapping may be performed according to a size of the current block, and a traditional intra prediction mode [0, 66] may be extended to [−14, 80]. A specific mapping process is as follows.

First, a width-to-height ratio factor (which may be represented by whRatio) is calculated, as shown below.

$$whRatio=Abs(Log\ 2(nTbW/nTbH)) \quad (2)$$

For a current block that is not square (that is, nTbW is not equal to nTbH), following correction may be made to predModeIntra in this case: if nTbW is greater than nTbH, predModeIntra is greater than or equal to 2, and predModeIntra is less than ((whRatio>1? (8+2×whRatio):8), then predModeIntra=(predmodeintra+65); otherwise, if nTbW is less than nTbH, predModeIntra is less than or equal to 66, and predModeIntra is greater than ((whRatio>1? (60−2× whRatio):60), then predModeIntra=(predmodeintra−67).

In the current H.266/VVC, a value of an LFNST index (which may be represented by SetIdx) may be determined according to a value of predModeIntra and Table 1, and specific values are shown in Table 1. Here, the value of the LFNST index is set to indicate that an LFNST is used for a current block and an index of an LFNST transform kernel in an LFNST transform kernel candidate set. Generally speaking, the LFNST transform set includes four transform kernel candidate sets (set0, set1, set2, and set3), and values corresponding to SetIdx are 0, 1, 2, and 3 respectively.

TABLE 1

| predModeIntra | SetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

In the current H.266/VVC, for a MIP mode, since a value of predModeIntra is set to indicate an index of a PLANAR mode (i.e. 0), a transform set with an LFNST index equal to 0 may only be selected for a transform set used for a current block in the MIP mode, which leads to lack of variability when an LFNST is performed in the MIP mode and reduces an encoding efficiency.

In an embodiment of the present application, an LFNST transform kernel candidate set may be determined according to a MIP parameter first, then an LFNST transform kernel used for a current block is determined from the LFNST transform kernel candidate set, and an LFNST index is set and signalled in a video bitstream. Here, an LFNST transform matrix is a matrix with multiple fixed coefficients obtained through training, and the LFNST transform kernel candidate set includes two groups of transform matrices (may also be called LFNST transform kernels). After the LFNST transform kernel candidate set is determined, one group of LFNST transform kernels need to be selected from the LFNST transform kernel candidate set, that is, a transform matrix used when an LFNST is performed on the current block is determined.

Here, the MIP parameter may include a MIP transposition indication parameter (which may be represented by isTransposed), a MIP mode index (which may be represented by modeId), a size of the current block, a category of the current block (which may be represented by mipSizeId), and other parameters. How to select an LFNST transform kernel used for the current block according to the MIP parameter will be described in detail in the following.

Optionally, in some embodiments, when the MIP parameter is the MIP transposition indication parameter, for S304, the determining the LFNST transform kernel used for the current block according to the MIP parameter when the LFNST is used for the current block, setting the LFNST index, and signalling it in the video bitstream may include: selecting a transform kernel used for the current block from an LFNST transform kernel candidate set; performing a matrix transposition processing on the selected transform kernel to obtain an LFNST transform kernel used for the current block when a value of the MIP transposition indication parameter indicates to perform a transposition processing on a sample input vector used in a MIP mode; setting a value of the LFNST index indicating that an LFNST is used for the current block and an index of the LFNST transform kernel in the LFNST transform kernel candidate set; wherein the LFNST transform kernel candidate set contains two or more preset transform kernels used for MIP.

It should be noted that since the LFNST transform kernel candidate set includes two or more preset transform kernels used for MIP, in this case, the transform kernel used for the current block may be selected by using Rate Distortion Optimization. Specifically, a Rate Distortion Cost (RDCost) may be calculated by using Rate Distortion Optimization for each transform kernel respectively, and then a transform kernel with a lowest Rate Distortion Cost is selected as the transform kernel used for the current block.

That is to say, on the encoder side, a group of LFNST transform kernels may be selected through an RDCost, and an index (which may be represented as lfnst_idx) corresponding to an LFNST transform kernel may be signalled in a video bitstream and transmitted to the decoder side. Herein, when a first group of LFNST transform kernels (that is, a first group of transform matrices) in the LFNST transform kernel candidate set is selected, lfnst_idx is set to 1; and when a second group of LFNST transform kernels (that is, a second group of transform matrices) in the LFNST transform kernel candidate set is selected, lfnst_idx is set to 2.

It should also be noted that, since the value of the MIP transposition indication parameter is used for indicating whether to perform a transposition processing on the sample input vector used in the MIP mode, when the value of the MIP transposition indication parameter is equal to 1, that is, when the value of the MIP transposition indication parameter indicates to perform a transposition processing on the sample input vector used in the MIP mode, a matrix transposition processing needs to be performed on the selected transform kernel to obtain an LFNST transform kernel used for the current block.

Here, for a value of an LFNST index (that is, lfnst_idx), when the value of the LFNST index is equal to 0, an LFNST will not be used. When the value of the LFNST index is greater than 0, an LFNST will be used, and an index of a transform kernel is equal to the value of the LFNST index or a value obtained by subtracting 1 from the value of the LFNST index. Therefore, after the LFNST transform kernel used for the current block is determined, the LFNST index needs to be set and signalled in a video bitstream, which is facilitates the decoder side to obtain the LFNST index by parsing the bitstream subsequently.

Optionally, in some embodiments, when the MIP parameter is the MIP mode index, for S304, the determining the LFNST transform kernel used for the current block according to the MIP parameter when the LFNST is used for the current block, setting the LFNST index, and signalling it in the video bitstream may include: determining a value of an LFNST intra prediction mode index according to a value of the MIP mode index; selecting one LFNST transform kernel candidate set from multiple LFNST transform kernel candidate sets according to the value of the LFNST intra prediction mode index; selecting a transform kernel indicated by the LFNST index from the selected LFNST transform kernel candidate set and setting the transform kernel as an LFNST transform kernel used for the current block; setting a value of the LFNST index indicating that an LFNST is used for the current block and an index of the LFNST transform kernel in the LFNST transform kernel candidate set, wherein the LFNST transform kernel candidate set contains two or more preset LFNST transform kernels.

It should be noted that the MIP mode index is used for indicating a MIP mode used for the current block, and the MIP mode is used for indicating a calculation and derivation method for determining an intra prediction value of the current block by using MIP. That is, an LFNST transform kernel may also be determined according to the MIP mode index.

It should also be noted that after the MIP mode index is determined, the MIP mode index may also be converted into the value of the LFNST intra prediction mode index (which may be represented by predModeIntra). Then, according to the value of predModeIntra, one LFNST transform kernel candidate set is selected from multiple LFNST transform kernel candidate sets to determine a transform kernel candidate set, and in the selected LFNST transform kernel candidate set, the transform kernel indicated by the LFNST index is selected and set as an LFNST transform kernel used for the current block.

Here, for a value of the LFNST index, when the value of the LFNST index is equal to 0, an LFNST will not be used. When the value of the LFNST index is greater than 0, an LFNST will be used, and an index of a transform kernel is equal to the value of the LFNST index or a value obtained by subtracting 1 from the value of the LFNST index. Therefore, after the LFNST transform kernel used for the current block is determined, the LFNST index needs to be set and signalled in a video bitstream, which facilitates the decoder side to obtain the LFNST index by parsing the bitstream subsequently.

Optionally, in some embodiments, when the MIP parameter is a MIP mode index and a MIP transposition indication parameter, for S304, the determining the LFNST transform kernel used for the current block according to the MIP parameter when the LFNST is used for the current block, setting the LFNST index, and signalling it in the video bitstream may include: determining a value of an LFNST intra prediction mode index according to a value of the MIP mode index; selecting one LFNST transform kernel candidate set from multiple LFNST transform kernel candidate sets according to the value of the LFNST intra prediction mode index; selecting a transform kernel indicated by the LFNST index from the selected LFNST transform kernel candidate set and setting the transform kernel as an LFNST transform kernel used for the current block; performing a matrix transposition processing on the LFNST transform kernel used for the current block when a value of the MIP transposition indication parameter indicates to perform a transposition processing on a sample input vector used in a MIP mode, and setting a transform kernel obtained after the transposition processing as the LFNST transform kernel used for the current block; setting a value of the LFNST index indicating that an LFNST is used for the current block and an index of the LFNST transform kernel in the LFNST transform kernel candidate set, wherein the LFNST transform kernel candidate set contains two or more preset LFNST transform kernels.

It should be noted that the MIP mode index is used for indicating a MIP mode used for the current block, and the MIP mode is used for indicating a calculation and derivation method for determining an intra prediction value of the current block by using MIP. The value of the MIP transposition indication parameter is used for indicating whether to perform the transposition processing on the sample input vector used in the MIP mode; that is, an LFNST transform kernel may also be determined according to a combination of the MIP transposition indication parameter and the MIP mode index.

It should also be noted that after the MIP mode index is determined, the MIP mode index may also be converted into the value of the LFNST intra prediction mode index (which may be represented by predModeIntra). Then, according to the value of predModeIntra, one LFNST transform kernel candidate set is selected from multiple LFNST transform kernel candidate sets to determine a transform kernel candidate set, and in the selected LFNST transform kernel candidate set, the transform kernel indicated by the LFNST index is selected. When it is indicated that a transposition processing is needed, a matrix transposition processing also needs to be performed on the LFNST transform kernel used for the current block, and then a transform kernel obtained after the transposition processing is set as the LFNST transform kernel used for the current block.

Here, for the value of the LFNST index, when the value of the LFNST index is equal to 0, an LFNST will not be used. When the value of the LFNST index is greater than 0, an LFNST will be used, and an index of a transform kernel is equal to the value of the LFNST index or a value obtained by subtracting 1 from the value of the LFNST index. Therefore, after the LFNST transform kernel used for the current block is determined, the LFNST index needs to be set and signalled in a video bitstream, which facilitates the decoder side to obtain the LFNST index by parsing the bitstream subsequently.

It should also be noted that, for the above-mentioned methods of selecting an LFNST transform kernel used for a current block, experimental results show that an LFNST transform kernel determined according to a combination of a MIP transposition indication parameter and a MIP mode index has the best performance.

Furthermore, when a MIP parameter at least includes a MIP mode index (modeId), a value of an LFNST intra prediction mode index may also be obtained by looking up a table in a process of selecting an LFNST transform kernel used for a current block.

Specifically, in some embodiments, the determining the value of the LFNST intra prediction mode index according to the value of the MIP mode index may include: determining the value of the LFNST intra prediction mode index corresponding to the value of the MIP mode index by using a first look-up table, wherein the first look-up table at least contains one or more different MIP mode indices respectively corresponding to each of two LFNST intra prediction mode indices of different values.

Here, the first look-up table (Look-Up Table 1, LUT1) is used for reflecting a corresponding relationship between a MIP mode index and an LFNST intra prediction mode index, that is, the first look-up table at least contains one or more different MIP mode indices respectively corresponding to each of two LFNST intra prediction mode indices of different values.

That is to say, different MIP modes may correspond to different values of predModeIntra. In this way, a MIP mode index is determined according to a MIP mode, and then a value of predModeIntra is determined according to the first look-up table. Then, one LFNST transform kernel candidate set is selected from multiple LFNST transform kernel candidate sets according to the value of predModeIntra, and then an LFNST transform kernel used for a current block is determined.

It may be understood that the value of predModeIntra may be determined according to a value of a MIP mode index (modeId). Then, according to the value of predModeIntra, a value of SetIdx may be directly determined according to Table 2, that is, the LFNST transform kernel candidate set selected for the current block is determined. Here, the value of SetIdx indicates a transform kernel candidate set used when an LFNST is performed. Since a value of modeId may include 0, 1, 2, 3, 4, and 5, the value of predModeIntra is also 0, 1, 2, 3, 4, and 5. A corresponding relationship between predModeIntra and SetIdx is as follows.

TABLE 2

| predModeIntra | SetIdx |
| --- | --- |
| 0 | 2 |
| 1 | 2 |
| 2 | 0 |
| 3 | 0 |
| 4 | 1 |
| 5 | 3 |

Further, the LFNST transform kernel candidate set may also be directly determined according to the value of the MIP mode index. In this case, a value of predModeIntra is no longer needed, that is, the value of the LFNST intra prediction mode index no longer needs to be determined according to the MIP mode index.

Optionally, in some embodiments, the determining the LFNST transform kernel used for the current block according to the MIP parameter when the LFNST is used for the current block, setting the LFNST index, and signalling it in the video bitstream may include: selecting one LFNST transform kernel candidate set from multiple LFNST transform kernel candidate sets according to a value of a MIP mode index; selecting a transform kernel indicated by the LFNST index from the selected LFNST transform kernel candidate set and setting it as an LFNST transform kernel used for the current block; setting a value of the LFNST index indicating that an LFNST is used for the current block and an index of the LFNST transform kernel in the LFNST transform kernel candidate set, wherein the LFNST transform kernel candidate set contains two or more preset LFNST transform kernels.

Further, the selecting one LFNST transform kernel candidate set from the multiple LFNST transform kernel candidate sets according to the value of the MIP mode index may include: determining a value of an LFNST transform kernel candidate set index corresponding to the value of the MIP mode index by using a second look-up table, and selecting an LFNST transform kernel candidate set indicated by the value of the LFNST transform kernel candidate set index as the selected LFNST transform kernel candidate set; wherein the second look-up table (Look-Up Table 2, LUT2) at least contains one or more different MIP mode indices respectively corresponding to each of two LFNST transform kernel candidate set indices of different values.

It should be noted that, if a prediction mode used for the current block is a MIP mode, the selected LFNST transform kernel candidate set may be determined according to the value of the MIP mode index (modeId). As shown in Table 3, each MIP mode index corresponds to one LFNST transform kernel candidate set.

TABLE 3

| modeId | SetIdx |
| --- | --- |
| 0 | 0 |
| 1 | 0 |
| 2 | 0 |
| 3 | 1 |
| 4 | 2 |
| 5 | 3 |

In this way, according to the value of the MIP mode index, a value of a corresponding LFNST transform kernel candidate set index may be determined, so that an LFNST transform kernel candidate set indicated by the value of the LFNST transform kernel candidate set index is selected as the selected LFNST transform kernel candidate set. For example, it may be seen from Table 3 that when a value of a MIP mode index (modeId) is 0, in this case, it may be determined that a value of an LFNST transform kernel candidate set index (SetIdx) is 0, that is, a transform kernel candidate set indicated by 0 is taken as a selected LFNST transform kernel candidate set. Or, when modeId is 3, it may be determined that a value of SetIdx is 1 in this case, that is, a transform kernel candidate set indicated by 1 is taken as a selected LFNST transform kernel candidate set, and so on.

Optionally, in some embodiments, the selecting one LFNST transform kernel candidate set from the multiple LFNST transform kernel candidate sets according to the value of the MIP mode index may include: determining an LFNST transform kernel candidate set index by using a first calculation method according to the value of the MIP mode index; selecting an LFNST transform kernel candidate set indicated by a value of the LFNST transform kernel candidate set index as the selected LFNST transform kernel candidate set.

Further, the determining the LFNST transform kernel candidate set index by using the first calculation method according to the value of the MIP mode index may include: setting a value of the LFNST transform kernel candidate set index to be equal to the value of the MIP mode index when the value of the MIP mode index is less than a first preset value; setting a value of the LFNST transform kernel candidate set index to be equal to a difference value obtained by subtracting a second preset value from the value of the MIP mode index when the value of the MIP mode index is greater than or equal to the first preset value, wherein the first preset value and the second preset value are both integer values.

In the embodiment of the present application, a value of the first preset value may be equal to 3, and a value of the second preset value may be equal to 2.

That is to say, according to the value of the MIP mode index, the LFNST transform kernel candidate set index may be determined by using the first calculation method, wherein a first calculation formula is as follows.

$$\text{SetIdx} = \text{modeId} < x\,?\,0:(\text{modeId} - y) \qquad (3)$$

Herein, x represents a first preset value, y represents a second preset value; SetIdx represents a value of an LFNST transform kernel candidate set index, and modeId represents a value of a MIP mode index.

Specifically, it is assumed that x is equal to 3 and y is equal to 2; then when modeId<3, it means that SetIdx may be 0 at this time; when modeId>3, it means that SetIdx may be modeId–2 at this time; that is, when modeId=3, SetIdx may be 1; when modeId=4, SetIdx may be 2; when modeId=5, SetIdx may be 3. It may be seen that according to the formula (3) that an obtained value of SetIdx is the same as contents of Table 3.

In addition, if a prediction mode of a current block is a MIP mode, for determination of an LFNST transform kernel candidate set, one of transform sets (such as set1 or set2 or set3) may also be fixedly selected as one LFNST transform kernel candidate set selected from multiple LFNST transform kernel candidate sets.

In addition, if the prediction mode of the current block is a MIP mode, an LFNST transform kernel candidate set may also be selected according to a value of a MIP mode index (modeId). As shown in Table 4, each MIP mode corresponds to one LFNST transform kernel candidate set. Here, a specific number of an LFNST transform kernel candidate set is limited, wherein any value may be taken from {0, 1, 2, 3} for each of a, b, c, d, and e.

TABLE 4

| modeId | SetIdx |
| --- | --- |
| 0 | a |
| 1 | b |
| 2 | c |
| 3 | d |
| 4 | e |
| 5 | f |

It should also be noted that if the prediction mode of the current block is a MIP mode, an LFNST transform kernel candidate set may also be selected according to one or more information combinations in a MIP parameter. Or mapping with a traditional intra prediction mode may also be performed based on the MIP parameter, and then an LFNST transform kernel candidate set is selected according to a mapped angle. Even a transform matrix (i.e. transform kernel) to be used may also be determined according to one or more information combinations in the MIP parameter, and it is determined that the transform matrix includes selections of a transform set and a transform matrix group. Here, a certain transform matrix group in a certain transform set may be fixedly selected according to the MIP parameter, and there is no need to make a selection on the encoder side, and lfnst_idx does not need to be transmitted in this case.

Further, in some embodiments, when a prediction mode parameter indicates that a non-MIP mode is used for a current block, the method may further include: determining a value of predModeIntra based on an intra prediction mode; selecting one LFNST transform kernel candidate set from multiple LFNST transform kernel candidate sets according to the value of predModeIntra.

That is to say, if a prediction mode of the current block is a non-MIP mode, then a value of predModeIntra may be determined according to the intra prediction mode in this case. Then, according to the value of predModeIntra and in combination with the above-mentioned Table 1 simultaneously, an LFNST transform kernel candidate set may be selected from multiple LFNST transform kernel candidate sets, and then a transform kernel indicated by an LFNST index is selected from the selected LFNST transform kernel candidate set and set as an LFNST transform kernel used for the current block. A value of the LFNST index is set to indicate that an LFNST is used for the current block and an index of the LFNST transform kernel in the LFNST transform kernel candidate set.

Here, for the value of an LFNST index, when the value of the LFNST index is equal to 0, an LFNST will not be used. When the value of the LFNST index is greater than 0, an LFNST will be used, and an index of a transform kernel is equal to the value of the LFNST index or a value obtained by subtracting 1 from the value of the LFNST index. Therefore, after the LFNST transform kernel used for the current block is determined, the LFNST index further needs to be set and signalled in a video bitstream, which facilitates the decoder side to obtain the LFNST index by parsing the bitstream subsequently.

S305: performing a transform processing on the residual value by using the LFNST transform kernel.

It should be noted that after the LFNST transform kernel is determined, a transform matrix selected for the current block may be obtained, and at this time a transform processing may be performed on the residual value.

Herein, each group of transform matrices may also contain basic transform matrices T with two sizes, such as 16×16 and 16×48. However, for transform matrices selected for Transform units (TUs) with four sizes, specifically for a TU with a size of 4×4, a transform matrix of 8×16 will be used, the transform matrix of 8×16 comes from first 8×16 of a transform matrix of 16×16. For a TU with a size of 4×N or N×4 (N>4), a transform matrix of 16×16 will be used. For a TU with a size of 8×8, a transform matrix of 8×48 will be used, and the transform matrix of 8×48 comes from first 8×48 of a transform matrix of 16×48. For a TU with a size larger than 8×8, a transform matrix of 16×48 will be used. It should be noted that in the current H.266/VVC, only an LFNST transform matrix (which may be represented by $T^T$) on the decoder side is stored, while a transform matrix used on the encoder side is a transposition matrix (which may be represented by T) of an LFNST transform matrix.

It should also be noted that an LFNST is to apply a Non-Separable Transform based on direct matrix multiplication. In order to reduce computational complexity and a storage space as much as possible, a simplified Non-Separable Transform technology is used in an LFNST transform. Herein, a main idea of the simplified Non-Separable Transform technology is to map N-dimensional vectors to R-dimensional vectors in a different space, wherein N/R(R<N) is a scaling factor. In this case, a transform matrix corresponding to the simplified Non-Separable Transform technology is an R×N matrix, as shown below.

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & \ddots & & \vdots \\ t_{R1} & t_{R2} & t_{R3} & \cdots & t_{RN} \end{bmatrix} \qquad (4)$$

Figure 5:
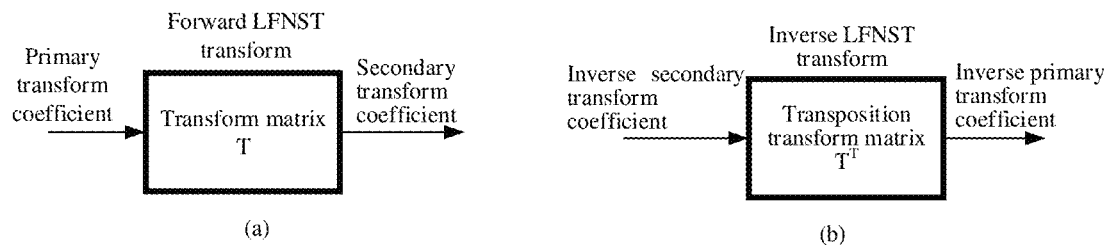
FIG. 5 is a schematic structural diagram of a calculation process of matrix multiplication of an LFNST technology according to an embodiment of the present application.

Here, transform matrices used for a forward LFNST transform and an inverse LFNST transform are in a transposition relationship with each other. Referring to FIG. 5, FIG. 5 shows a schematic structural diagram of a calculation process of matrix multiplication of an LFNST technology according to an embodiment of the present application. As shown in FIG. 5, (a) shows a calculation process of a forward LFNST transform, and a secondary transform coefficient may be obtained after a primary transform coefficient passes through a transform matrix T; (b) shows a calculation process of an inverse LFNST transform, secondary transform coefficient and an inverse primary transform coefficient may be obtained after an inverse secondary transform coefficient passes through a transposition transform matrix $T^T$.

Further, in an LFNST technology, it may be determined whether to use a 4×4 Non-Separable Transform or an 8×8 Non-Separable Transform according to a size of a current block. Here, the "4×4 Non-Separable Transform" may be collectively referred to as a "4×4 LFNST" and the "8×8 Non-Separable Transform" may be collectively referred to as an "8×8 LFNST". Herein, it is assumed that the current block has a width of nTbW and a height of nTbH, it may be concluded that if min(nTbW, nTbH)<=4, then a 4×4 LFNST may be used for the current block; otherwise, an 8×8 LFNST may be used for the current block. It should be noted that a return value of min (A, B) is a smaller value among A and B.

In one implementation mode, for a 4×4 LFNST, on the encoder side, 16 coefficients will be input, and 16 or 8 coefficients will be output after a forward LFNST. On the decoder side, 16 or 8 coefficients will be input and 16 coefficients will be output. That is to say, for the encoder and the decoder, a quantity of inputs and a quantity of outputs are just opposite to each other.

It is assumed that a size of a Transform Unit (TU) may be represented as nTbW×nTbH, wherein a transform unit is a prediction residual block obtained based on a residual value. That is, a size of a TU may be equal to 4×4, 4×N, or N×4 (N>4). Each of them will be described in detail below.

Figure 6A:
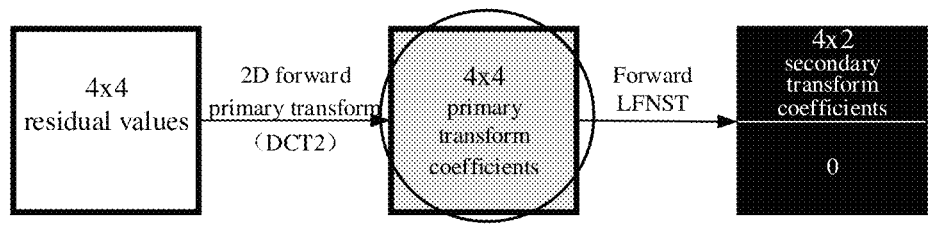
FIG. 6A is a structural block diagram of an LFNST transform according to a related technical solution.

When a sized of a TU is equal to 4×4, a forward LFNST process corresponding to a 4×4 transform unit is shown in FIG. 6A. In FIG. 6A, a white block is a residual value, a gray block is a primary transform coefficient, and a black block is a secondary transform coefficient. Here, at a position exemplified by "0", a transform coefficient is set to 0 by an encoder. For the 4×4 transform unit, when performing a forward LFNST, a size of a transform matrix used is 8×16, and all 4×4 primary transform coefficients in the current transform unit are used as an input, and an output is 4×2 secondary transform coefficients.

Figure 6B:
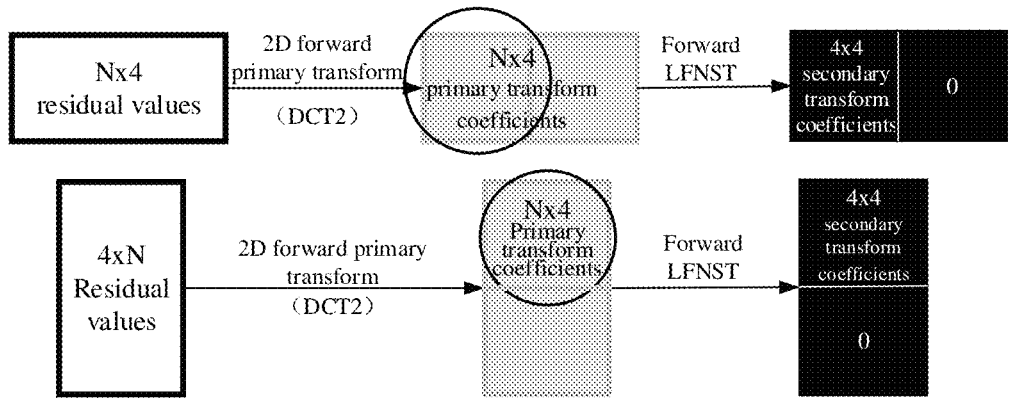
FIG. 6B is a structural block diagram of another LFNST transform according to a related technical solution.

When a size of a TU is equal to 4×N or N×4 (N>4), a forward LFNST process corresponding to a 4×N or 4×4 transform unit is shown in FIG. 6B. In FIG. 6B, a white block is a residual value, a gray block is a primary transform coefficient, and a black block is a secondary transform coefficient. Here, for a 4×N or N×4 transform unit, when performing a forward LFNST, a size of a transform matrix used is 16×16, and primary transform coefficients in a first 4×4 sub-block in a current transform unit (specifically, an uppermost sub-block for a 4×N transform unit and a leftmost sub-block for an N×4 transform unit) are used as an input and an output is 4×4 secondary transform coefficients. Here, at a position exemplified by "0", a transform coefficient is still set to 0 by the encoder.

In another implementation mode, for an 8×8 LFNST, on the encoder side, 48 coefficients will be input, and 16 or 8 coefficients will be output after a forward LFNST. On the decoder side, 16 or 8 coefficients will be input and 48 coefficients will be output. That is to say, for the encoder and the decoder, a quantity of inputs and a quantity of outputs are just opposite to each other.

Figure 6C:
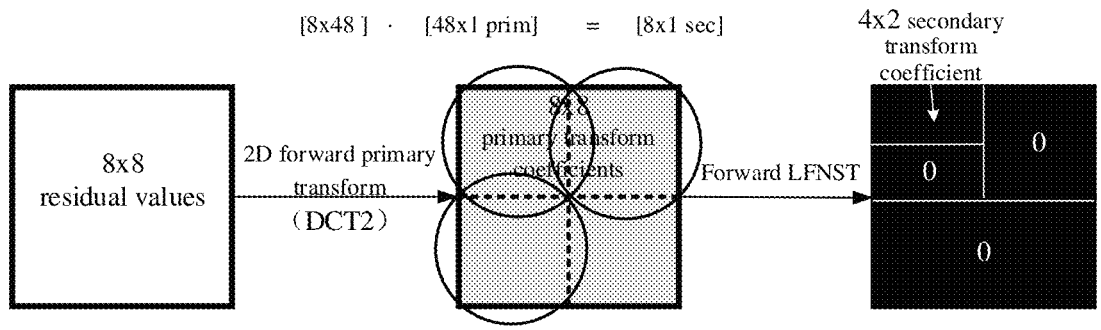
FIG. 6C is a structural block diagram of another LFNST transform according to a related technical solution.

When a size of a TU is equal to 8×8, a forward LFNST process corresponding to an 8×8 transform unit is shown in FIG. 6C. In FIG. 6C, a white block is a residual value, a gray block is a primary transform coefficient, and a black block is a secondary transform coefficient. For a 8×8 transform unit, when performing a forward LFNST, a size of a transform matrix used is 8×48. Primary transform coefficients of first three 4×4 sub-blocks in a current transform unit (that is, three sub-blocks at an upper left corner) are used as an input, and an output is 4×2 secondary transform coefficients. Here, at a position exemplified by "0", a transform coefficient is still set to 0 by the encoder.

Figure 6D:
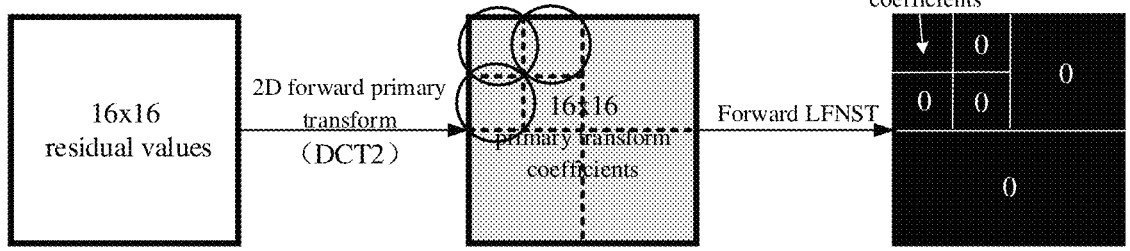
FIG. 6D is a structural block diagram of another LFNST transform according to a related technical solution.

When a TU is greater than 8×8, a forward LFNST process corresponding to a transform unit larger than 8×8 is shown in FIG. 6D. In FIG. 6D, a white block is a residual value, a gray block is a primary transform coefficient, and a black block is a secondary transform coefficient. For a transform unit larger than 8×8, when performing a forward LFNST, a size of a transform matrix used is 48×16. Primary transform coefficients of first three 4×4 sub-blocks in a current transform unit (that is, three sub-blocks at an upper left corner) are used as input, and an output is 4×4 secondary transform coefficients. Here, at a position exemplified by "0", a transform coefficient is still set to 0 by the encoder.

In this way, whether a TU corresponding to a residual value has a size of 4×4, 4×N, or N×4 (N>4), 8×8, or even larger than 8×8, in this case, a transform processing performed on the residual value may be achieved according to FIG. 6A or FIG. 6B or FIG. 6C or FIG. 6D.

In the embodiment of the present application, applicability of an LFNST technology to a current block using a MIP mode may be improved, so that selection of a transform set (or transform kernel) is more flexible. In an LFNST process of a current block using a MIP mode, related information of a MIP parameter is introduced, and characteristics of the current block are determined according to the MIP information, and then a transform set (or transform kernel) is selected. For example, this transform method is applied to VTM7.0, and tested under an All Intra condition at 24 frame intervals. Based on an average bit rate change under a same Peak Signal to Noise Ratio (PSNR), Bjøntegaard-Delta rate (BD-rate) changes of −0.03%, 0.00%, and −0.01% may be obtained on three colour components (namely Y, Cb, and Cr) respectively; especially on a large resolution sequence, there will be better performance. Specifically, on Class A1, a BD-rate change of −0.10% in Y may be achieved, thus improving an encoding efficiency.

The embodiment provides a transform method, which is applied to an encoder. In the transform method, a prediction mode parameter of a current block is determined; a Matrix-based Intra Prediction (MIP) parameter is determined when the prediction mode parameter indicates that MIP is used for the current block to determine an intra prediction value; the intra prediction value of the current block is determined according to the MIP parameter, and a residual value between the current block and the intra prediction value is calculated; when a Low-Frequency Non-Separable Transform (LFNST) is used for the current block, an LFNST transform kernel used for the current block is determined according to the MIP parameter, an LFNST index is set and signalled in a video bitstream; and a transform processing is performed on the residual value by using the LFNST transform kernel. In this way, for the current block using the MIP mode, the MIP parameter is introduced during an LFNST transform, which makes selection of the LFNST transform kernel more flexible, thus not only applicability of the LFNST technology to a non-traditional intra prediction mode is improved, but also an encoding efficiency is improved, and at the same time, video picture quality can also be improved.

Figure 7:
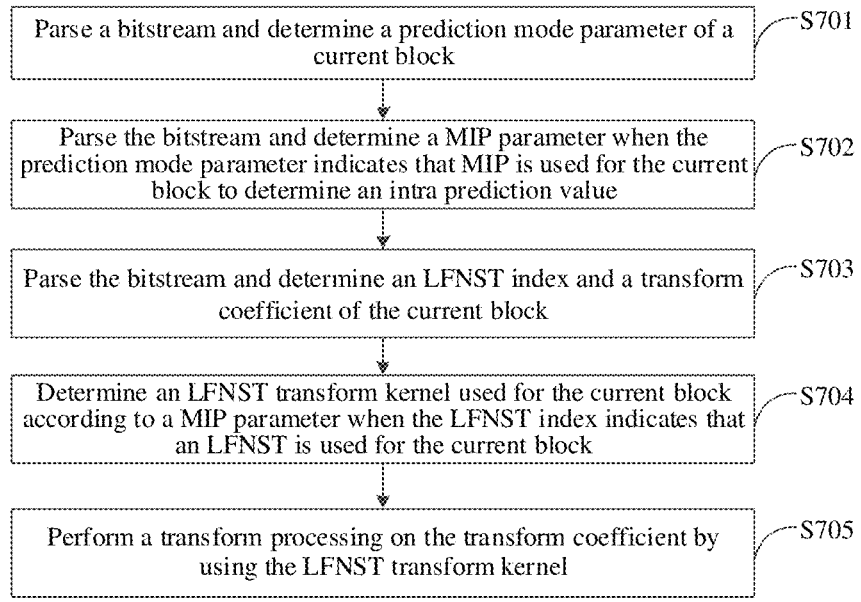
FIG. 7 is a schematic flowchart of another transform method according to an embodiment of the present application.

Based on the application scenario example in FIG. 2B, referring to FIG. 7, it shows a schematic flowchart of another transform method according to an embodiment of the present application. As shown in FIG. 7, the method may include following acts.

S701: parsing a bitstream and determining a prediction mode parameter of a current block.

It should be noted that the prediction mode parameter indicates a coding mode of the current block and a parameter related to the mode. Herein, a prediction mode usually includes a traditional intra prediction mode and a non-traditional intra prediction mode, while the traditional intra prediction mode may include a DC mode, a PLANAR mode, and an angular mode, etc., and the non-traditional intra prediction mode may include a MIP mode, a CCLM mode, an IBC mode, and a PLT mode, etc.

It should also be noted that on an encoder side, prediction coding will be performed for the current block, and in this process, a prediction mode of the current block may be determined, a corresponding prediction mode parameter is signalled in a bitstream, and transmitted by an encoder to a decoder.

On a decoder side, an intra prediction mode of a luma or chroma component of the current block or a coding block where the current block is located may be acquired by parsing a bitstream, and a value of predModeIntra may be determined at this time, and a calculation formula is the same as the aforementioned formula (1).

In the formula (1), a colour component indicator (which may be represented by cIdx) is used for indicating a luma component or a chroma component of the current block. Here, if what is predicted for the current block is a luma component, then cIdx is equal to 0; if what is predicted for the current block is a chroma component, then cIdx is equal to 1. In addition, (xTbY, yTbY) is a coordinate of a sample in an upper left corner of the current block, IntraPredModeY [xTbY][yTbY] is an intra prediction mode of a luma component, and IntraPredModeC[xTbY][yTbY] is an intra prediction mode of a chroma component.

S702: parsing the bitstream and determining a Matrix-based Intra Prediction (MIP) parameter when the prediction mode parameter indicates that MIP is used for the current block to determine an intra prediction value.

It should be noted that the MIP parameter may include a MIP transposition indication parameter (which may be represented by isTransposed), a MIP mode index (which may be represented by modeId), a size of the current block, a category of the current block (which may be represented by mipSizeId), and other parameters. Values of these parameters may be obtained by parsing the bitstream.

In some embodiments, a value of isTransposed may be determined by parsing a bitstream. When the value of isTransposed is equal to 1, a sample input vector used in a MIP mode needs to be subjected to a transposition processing. When the value of isTransposed is equal to 0, there is no need to perform a transposition processing on a sample input vector used in a MIP mode. That is to say, a MIP transposition indication parameter may be used for indicating whether to perform a transposition processing on a sample input vector used in a MIP mode.

In some embodiments, a MIP mode index (which may be represented by modeId) may also be determined by parsing a bitstream. The MIP mode index may be used for indicating a MIP mode used for a current block, and the MIP mode may be used for indicating a calculation and derivation method for determining an intra prediction value of the current block by using MIP. That is to say, values of the MIP mode index corresponding to different MIP modes are different. Here, a value of a MIP mode index may be 0, 1, 2, 3, 4, or 5.

In some embodiments, parameter information such as a size of a current block, a width-to-height ratio, and a category of the current block (which may be represented by mipSizeId) may also be determined by parsing a bitstream. In this way, after a MIP parameter is determined, it is convenient for selecting an LFNST transform kernel (which may be represented by kernel) used for a current block according to the determined MIP parameter.

S703: parsing the bitstream and determining an LFNST index and a transform coefficient of the current block.

It should be noted that a value of the LFNST index may be used for indicating whether an LFNST is used for the current block, and an index of an LFNST transform kernel in an LFNST transform kernel candidate set. Specifically, after the LFNST index is obtained by parsing, when a value of the LFNST index is equal to 0, it indicates that an LFNST is not used for the current block; when the value of LFNST index is greater than 0, it indicates that an LFNST is used for the current block, and an index of a transform kernel is equal to the value of the LFNST index, or a value obtained by subtracting 1 from the value of the LFNST index.

It should also be noted that on a decoder side, input data of an LFNST may include: a luma position (xTbY, yTbY) of a current transform unit, a width nTbW of the current block, a height nTbH of the current block, whether the current block is a luma component or a chroma component cIdx, and a coefficient d[x][y] of the current transform unit after Scaling, where x=0, 1, . . . , nTbW−1, y=0, 1, . . . , nTbH−1. Output data of the LFNST may include: a primary transform coefficient d'[x][y] generated by a secondary transform coefficient through the LFNST, where x=0, 1, . . . , nLfnstSize−1, y=0, 1, . . . , nLfnstSize−1.

Figure 8:
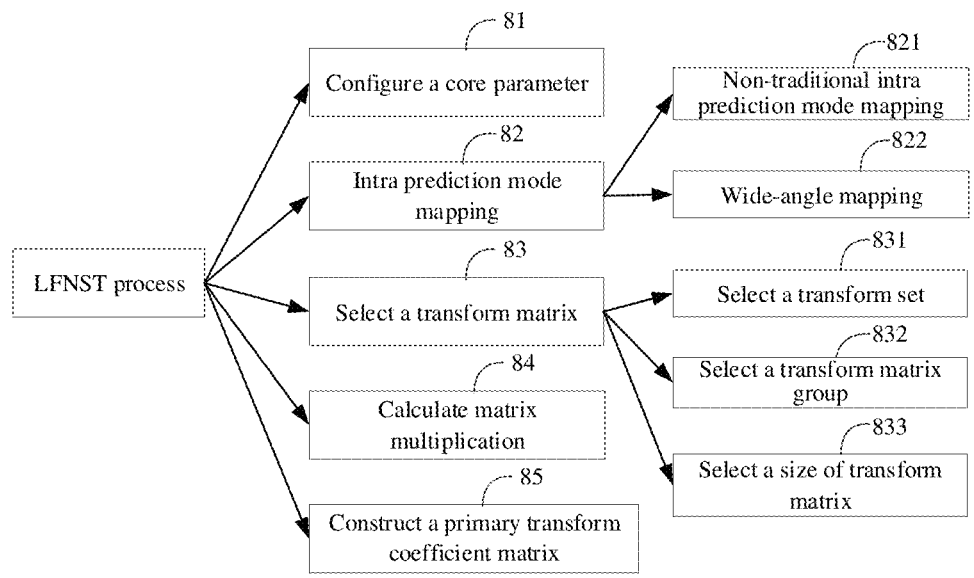
FIG. 8 is a flow block diagram of a specific process of LFNST according to an embodiment of the present application.

Specifically, as shown in FIG. 8, a specific process of an LFNST may be partitioned into five acts, which are: configuring a core parameter 81, mapping an intra prediction mode 82, selecting a transform matrix 83, calculating matrix multiplication 84, and constructing a primary transform coefficient matrix 85. Herein, for the mapping the intra prediction mode 82, this act is used for determining a value of predModeIntra, and mainly includes: a non-traditional intra prediction mode mapping 821 and a wide-angle mapping 822. For the selecting the transform matrix 83, this act is used for selecting a transform set and a transform matrix, and mainly includes: selecting a transform set 831, selecting a transform matrix group 832, and selecting a size of transform matrix 833.

For the configuring the core parameter 81, firstly a length of an input secondary transform coefficient vector (which may be represented by nonZeroSize) and a length of an output primary transform coefficient vector (which may be represented by nLfnstOutSzie) for LFNST calculation need to be configured. Values of nonZeroSize and nLfnstOutSzie are shown in Table 5.

TABLE 5

| Size of Transform Unit | nonZeroSize | nLfnstOutSzie |
|---|---|---|
| 4 × 4 | 8 | 16 |
| 4 × N or N × 4 (N > 4) | 16 | 16 |
| 8 × 8 | 8 | 48 |
| >8 × 8 | 16 | 48 |

In the current H.266/VVC, a configuration of a parameter such as nonZeroSize and nLfnstOutSzie is calculated through following formulas, which are as follows.

$$nLfnstOutSzie=(nTbW>=8\&\&nTbH>=8)?48:16 \quad (5)$$

$$nonZeroSize=(nTbW==4\&\&nTbH==4) \\ (nTbW==8\&\&nTbH==8)?8:16 \quad (6)$$

In addition, the parameter nLfnstSize also needs to be configured, which means that there is a primary transform coefficient only in a range of first nLfnstSizexnLfnstSize in a current block, and a value of nLfnstSize is as follows.

$$\text{Log } 2LfnstSize=(nTbW>=8\&\&nTbH>=8)?3:2 \quad (7)$$

$$nLfnstSize=1<<\text{Log } 2LfnstSize \quad (8)$$

At this time, an intra prediction mode of a luma or chroma component of the current block or a coding block where the current block is located may be acquired by parsing a bitstream, and a value of predModeIntra may be determined at this time, and a calculation formula is the same as the aforementioned formula (1).

Further, a vector u[i] of a secondary transform coefficient is acquired, where i=0, 1, . . . , nonZeroSize−1. When it is determined that an LFNST is used for the current transform unit, the coefficient d[x][y] after Scaling at this time is a secondary transform coefficient. First nonZeroSize values are acquired according to a diagonal scanning order, that is, the vector u[i] of the secondary transform coefficient, where i=0, 1, . . . , nonZeroSize−1. In a following formula, xC and yC are represented as an abscissa and an ordinate of a coefficient numbered x relative to an upper left corner point in a current block in a diagonal order), xC and yC are as follows.

$$xC=DiagScanOrder[2][2][x][0] \quad (9)$$

$$yC=DiagScanOrder[2][2][x][1] \quad (10)$$

$$u[i]=d[xC][yC] \quad (11)$$

Further, for mapping the intra prediction mode 82, an intra prediction mode may be partitioned into a traditional intra prediction mode and a non-traditional intra prediction mode. For a non-traditional intra prediction mode, information indicated by a value of predModeIntra is as follows: it indicates that a prediction mode of a current block is a CCLM mode if the value of predModeIntra may be INTRA_LT_CCLM, INTRA_L_CCLM, or INTRA_T_CCLM (which are 81, 82, 83 in VVC respectively); it indicates that the prediction mode of the current block is a MIP mode if intra_mip_flag[xTbY][yTbY] is equal to 1 and cIdx is equal to 0, and in this case the value of predModeIntra indicates a MIP mode index modeId used; if it is not in the above two situations, the value of predModeIntra may be in [0,66], which indicates that the prediction mode of the current block is a traditional intra prediction mode.

Further, by parsing a bitstream, an LFNST transform kernel candidate set index is determined according to a number of a traditional intra prediction mode. At this time, if the prediction mode of the current block is a CCLM mode or a MIP mode, the value of predModeIntra may also be set in following manners.

(1) When the value of predModeIntra indicates INTRA_LT_CCLM, INTRA_L_CCLM, or INTRA_T_CCLM (which are 81, 82, 83 in VVC respectively), if a mode of a central luma block of a luma position corresponding to the current block (such as a chroma block) is a MIP mode, that is, intra_mip_flag[xTbY+nTbW/2][yTbY+nTbH/2] is 1, then the value of predModeIntra is set as an index (i.e. 0) indicating a PLANAR mode; otherwise, if the mode of the central luma block of the luma position corresponding to the current block (such as a chroma block) is an IBC mode or a PLT mode, the value of predModeIntra is set as an index (i.e. 1) indicating a DC mode; otherwise, the value of predModeIntra is set as a value IntraPredModeY[xTbY+nTbW/2][yTbY+nTbH/2] of a mode index of the central luma block of the luma position corresponding to the current block (such as a chroma block).

(2) When intra_mip_flag[xTbY][yTbY] is equal to 1 and cIdx is equal to 0, that is, the prediction mode of a current block is a MIP mode, the value of predModeIntra may be directly set to an index (that is, 0) indicating a PLANAR mode.

For a traditional intra prediction mode (such as wide-angle mapping), in a process of parsing a bitstream, a wide-angle mapping may be performed according to a size of a current block, and a traditional intra prediction mode [0, 66] may be extended to [−14, 80]. A specific mapping process is as follows.

First, a width-to-height ratio factor (which may be represented by whRatio) is calculated, as shown in the above formula (2).

For a current block that is not square (that is, nTbW is not equal to nTbH), following correction may be made to a value of predModeIntra: if nTbW is greater than nTbH, predModeIntra is greater than or equal to 2, and predModeIntra is less than ((whRatio>1? (8+2×whRatio):8), then predmodeintra=(predmodeintra+65); otherwise, if nTbW is less than nTbH, predModeIntra is less than or equal to 66, and predModeIntra is greater than ((whRatio>1? (60−2×whRatio):60), then predmodeintra=(predmodeintra−67).

In the current H.266/VVC, a value of an LFNST index (which may be represented by SetIdx) may be determined according to a value of predModeIntra and Table 1, and specific values are shown in Table 1. Here, the value of the LFNST index is set to indicate that an LFNST is used for a current block and an index of an LFNST transform kernel in an LFNST transform kernel candidate set. Generally speaking, the LFNST transform set includes four transform kernel candidate sets (set0, set1, set2, and set3), and values corresponding to SetIdx are 0, 1, 2, and 3 respectively.

In the current H.266/VVC, for a MIP mode, since a value of predModeIntra is set to indicate an index of a PLANAR mode (i.e. 0), a transform set with an LFNST index equal to 0 may only be selected for a transform set used for a current block in the MIP mode, which leads to lack of variability when an LFNST is performed in the MIP mode and reduces a decoding efficiency. However, in the embodiment of the present application, after the LFNST index is determined, an LFNST transform kernel candidate set may be determined according to a MIP parameter first, and then an LFNST transform kernel used for the current block is determined from the LFNST transform kernel candidate set.

S704: determining an LFNST transform kernel used for the current block according to a MIP parameter when the LFNST index indicates that an LFNST is used for the current block.

Here, the MIP parameter may include a MIP transposition indication parameter (which may be represented by isTransposed), a MIP mode index (which may be represented by modeId), a size of the current block, a category of the current block (which may be represented by mipSizeId), and other parameters. how to select an LFNST transform kernel used for the current block according to the MIP parameter will be described in detail in the following.

Optionally, in some embodiments, when the MIP parameter is the MIP transposition indication parameter, for S704, the determining the LFNST transform kernel used for the current block according to the MIP parameter when the LFNST index indicates that the LFNST is used for the current block may include: selecting a transform kernel indicated by the LFNST index from an LFNST transform kernel candidate set; performing a matrix transposition processing on the selected transform kernel to obtain an LFNST transform kernel used for the current block when a value of the MIP transposition indication parameter indicates to perform a transposition processing on a sample input vector used in a MIP mode, wherein the LFNST transform kernel candidate set contains two or more preset transform kernels used for MIP.

It should be noted that since the LFNST transform kernel candidate set includes two or more preset transform kernels used for MIP, after the LFNST index is obtained by parsing a bitstream, a transform kernel indicated by the LFNST index may be selected from the LFNST transform kernel candidate set according to a value of the obtained LFNST index. For example, when the value of the LFNST index is 1, a first group of LFNST transform kernels (that is, a first group of transform matrices) in the LFNST transform kernel candidate set will be selected. When the value of the LFNST index is 2, a second group of LFNST transform kernels (that is, a second group of transform matrices) in the LFNST transform kernel candidate set will be selected.

It should also be noted that, since the value of the MIP transposition indication parameter is used for indicating whether to perform a transposition processing on the sample input vector used in the MIP mode, when the value of the MIP transposition indication parameter is equal to 1, that is, when the value of the MIP transposition indication parameter indicates to perform a transposition processing on the sample input vector used in the MIP mode, a matrix transposition processing needs to be performed on the selected transform kernel to obtain the LFNST transform kernel used for the current block.

Here, for the value of the LFNST index (that is, lfnst_idx), when the value of the LFNST index is equal to 0, an LFNST will not be used; when the value of the LFNST index is greater than 0, an LFNST will be used, and an index of a transform kernel is equal to the value of the LFNST index or a value obtained by subtracting 1 from the value of the LFNST index. In this way, the LFNST transform kernel used for the current block may be determined according to the LFNST index.

Optionally, in some embodiments, when the MIP parameter is the MIP mode index, for S704, the determining the LFNST transform kernel used for the current block according to the MIP parameter when the LFNST index indicates that the LFNST is used for the current block may include: determining a value of an LFNST intra prediction mode index according to a value of the MIP mode index; selecting one LFNST transform kernel candidate set from multiple LFNST transform kernel candidate sets according to the value of the LFNST intra prediction mode index; selecting a transform kernel indicated by the LFNST index from the selected LFNST transform kernel candidate set and setting the transform kernel as an LFNST transform kernel used for the current block, wherein the LFNST transform kernel candidate set contains two or more preset LFNST transform kernels.

It should be noted that the MIP mode index is used for indicating the MIP mode used for the current block, and the MIP mode is used for indicating a calculation and derivation method for determining an intra prediction value of the current block by using MIP. That is, the LFNST transform kernel may also be determined according to the MIP mode index.

It should also be noted that after the MIP mode index is determined, the MIP mode index may also be converted into the value of the LFNST intra prediction mode index (which may be represented by predModeIntra). Then, according to the value of predModeIntra, one LFNST transform kernel candidate set is selected from multiple LFNST transform kernel candidate sets to determine a transform kernel candidate set; and in the selected LFNST transform kernel candidate set, a transform kernel indicated by the LFNST index is selected and set as the LFNST transform kernel used for the current block.

Optionally, in some embodiments, when the MIP parameter is a MIP mode index and a MIP transposition indication parameter, for S704, the determining the LFNST transform kernel used for the current block according to the MIP parameter when the LFNST index indicates that the LFNST is used for the current block may include: determining a value of an LFNST intra prediction mode index according to a value of the MIP mode index; selecting one LFNST transform kernel candidate set from multiple LFNST transform kernel candidate sets according to the value of the LFNST intra prediction mode index; selecting a transform kernel indicated by the LFNST index from the selected LFNST transform kernel candidate set and setting the transform kernel as an LFNST transform kernel used for the current block; performing a matrix transposition processing on the LFNST transform kernel used for the current block when a value of the MIP transposition indication parameter indicates to perform a transposition processing on a sample input vector used in a MIP mode, and setting a transform kernel obtained after the transposition processing as the LFNST transform kernel used for the current block, wherein the LFNST transform kernel candidate set contains two or more preset LFNST transform kernels.

It should be noted that the MIP mode index is used for indicating a MIP mode used for the current block, and the MIP mode is used for indicating a calculation and derivation method for determining an intra prediction value of the current block by using MIP. The value of the MIP transposition indication parameter is used for indicating whether to perform the transposition processing on the sample input vector used in the MIP mode, that is, an LFNST transform kernel may also be determined according to a combination of the MIP transposition indication parameter and the MIP mode index.

It should also be noted that after the MIP mode index is determined, the MIP mode index may also be converted into the value of the LFNST intra prediction mode index (which may be represented by predModeIntra). Then, according to the value of predModeIntra, one LFNST transform kernel candidate set is selected from multiple LFNST transform kernel candidate sets to determine a transform kernel candidate set, and in the selected LFNST transform kernel candidate set, the transform kernel indicated by the LFNST index is selected. When it is indicated that a transposition processing is needed, a matrix transposition processing also needs to be performed on the LFNST transform kernel used for the current block, and then a transform kernel obtained after the transposition processing is set as the LFNST transform kernel used for the current block.

It should also be noted that, for the above-mentioned methods for selecting an LFNST transform kernel used for a current block, experimental results show that an LFNST transform kernel determined according to a combination of a MIP transposition indication parameter and a MIP mode index has the best performance.

Furthermore, when a MIP parameter at least includes a MIP mode index (modeId), a value of an LFNST intra prediction mode index may also be obtained by looking up a table in a process of selecting an LFNST transform kernel used for a current block.

Specifically, in some embodiments, the determining the value of the LFNST intra prediction mode index according to the value of the MIP mode index may include: determining the value of the LFNST intra prediction mode index corresponding to the value of the MIP mode index by using a first look-up table, wherein the first look-up table at least contains one or more different MIP mode indices respectively corresponding to each of two LFNST intra prediction mode indices of different values.

Here, the first look-up table (Look-Up Table 1, LUT1) is used for reflecting a corresponding relationship between a MIP mode index and an LFNST intra prediction mode index, that is, the first look-up table at least contains one or more different MIP mode indices corresponding respectively to each of two LFNST intra prediction mode indices of different values.

That is to say, different MIP modes may correspond to different values of predModeIntra. In this way, a MIP mode index is determined according to a MIP mode, and then a value of predModeIntra is determined according to the first look-up table. Then, one LFNST transform kernel candidate set is selected from multiple LFNST transform kernel candidate sets according to the value of predModeIntra, and then an LFNST transform kernel used for a current block is determined.

It may be understood that the value of predModeIntra may be determined according to a value of a MIP mode index (modeId). Then, according to the value of predModeIntra, a value of SetIdx may be directly determined according to Table 2, that is, the LFNST transform kernel candidate set selected for the current block is determined. Here, the value of SetIdx indicates a transform kernel candidate set used when an LFNST is performed. Since a value of modeId may include 0, 1, 2, 3, 4, and 5, the value of predModeIntra is also 0, 1, 2, 3, 4, and 5. A corresponding relationship between predModeIntra and SetIdx is shown in Table 2.

Further, the LFNST transform kernel candidate set may also be directly determined according to the value of the MIP mode index. In this case, a value of predModeIntra is no longer needed, that is, the value of the LFNST intra prediction mode index no longer needs to be determined according to the MIP mode index.

Optionally, in some embodiments, the determining the LFNST transform kernel used for the current block according to the MIP parameter when the LFNST index indicates that the LFNST is used for the current block may include: selecting one LFNST transform kernel candidate set from multiple LFNST transform kernel candidate sets according to a value of the MIP mode index; selecting a transform kernel indicated by the LFNST index from the selected LFNST transform kernel candidate set and setting the transform kernel as an LFNST transform kernel used for the current block, wherein the LFNST transform kernel candidate set contains two or more preset LFNST transform kernels.

Further, the selecting one LFNST transform kernel candidate set from the multiple LFNST transform kernel candidate sets according to the value of the MIP mode index may include: determining a value of an LFNST transform kernel candidate set index corresponding to the value of the MIP mode index by using a second look-up table, and selecting an LFNST transform kernel candidate set indicated by the value of the LFNST transform kernel candidate set index as the selected LFNST transform kernel candidate set, wherein the second look-up table (Look-Up Table 2, LUT2) at least contains one or more different MIP mode indices respectively corresponding to each of two LFNST transform kernel candidate set indices of different values.

It should be noted that, if a prediction mode used for the current block is a MIP mode, the selected LFNST transform kernel candidate set may be determined according to the value of the MIP mode index (modeId). As shown in Table 3, each MIP mode index corresponds to one LFNST transform kernel candidate set.

In this way, according to the value of the MIP mode index, a value of a corresponding LFNST transform kernel candidate set index may be determined, so that an LFNST transform kernel candidate set indicated by the value of the LFNST transform kernel candidate set index is selected as the selected LFNST transform kernel candidate set. For example, it may be seen from Table 3 that when a value of a MIP mode index (modeId) is 0, in this case, it may be determined that a value of an LFNST transform kernel candidate set index (SetIdx) is 0, that is, a transform kernel candidate set indicated by 0 is taken as a selected LFNST transform kernel candidate set. Or, when modeId is 3, it may be determined that a value of SetIdx is 1 in this case, that is, a transform kernel candidate set indicated by 1 is taken as a selected LFNST transform kernel candidate set, and so on.

Optionally, in some embodiments, the selecting one LFNST transform kernel candidate set from the multiple LFNST transform kernel candidate sets according to the value of the MIP mode index may include: determining an LFNST transform kernel candidate set index by using a first calculation method according to the value of the MIP mode index; selecting an LFNST transform kernel candidate set indicated by a value of the LFNST transform kernel candidate set index as the selected LFNST transform kernel candidate set.

Further, the determining the LFNST transform kernel candidate set index by using the first calculation method according to the value of the MIP mode index may include: setting a value of the LFNST transform kernel candidate set index to be equal to the value of the MIP mode index when the value of the MIP mode index is less than a first preset value; setting a value of the LFNST transform kernel candidate set index to be equal to a difference value obtained by subtracting a second preset value from the value of the MIP mode index when the value of the MIP mode index is greater than or equal to the first preset value, wherein the first preset value and the second preset value are both integer values.

In the embodiment of the present application, a value of the first preset value may be equal to 3, and a value of the second preset value may be equal to 2.

That is to say, according to the value of the MIP mode index, the LFNST transform kernel candidate set index may be determined by using the first calculation method, wherein the first calculation formula is shown in the above formula (3), wherein x represents a first preset value and y represents a second preset value; SetIdx indicates a value of an LFNST transform kernel candidate set index, and modeId indicates a value of a MIP mode index.

Specifically, it is assumed that x is equal to 3 and y is equal to 2; then when modeId<3, it means that SetIdx may be 0 at this time; when modeId>3, it means that SetIdx may be modeId−2 at this time; that is, when modeId=3, SetIdx may be 1; when modeId=4, SetIdx may be 2; when modeId=5, SetIdx may be 3. It may be seen that according to the formula (3) that an obtained value of SetIdx is the same as contents of Table 3.

In addition, if a prediction mode of a current block is a MIP mode, for determination of an LFNST transform kernel candidate set, one of transform sets (such as set1 or set2 or set3) may also be fixedly selected as one LFNST transform kernel candidate set selected from multiple LFNST transform kernel candidate sets.

In addition, if a prediction mode of a current block is a MIP mode, an LFNST transform kernel candidate set may also be selected according to a value of a MIP mode index (modeId). As shown in Table 4, each MIP mode corresponds to one LFNST transform kernel candidate set. Here, a specific number of an LFNST transform kernel candidate set is limited, wherein any value may be taken from {0, 1, 2, 3} for each of a, b, c, d, and e.

It should also be noted that if the prediction mode of the current block is a MIP mode, an LFNST transform kernel candidate set may also be selected according to one or more information combinations in a MIP parameter. Or mapping with a traditional intra prediction mode may also be performed based on the MIP parameter, and then an LFNST transform kernel candidate set is selected according to a mapped angle. Even a transform matrix (i.e. transform kernel) to be used may also be determined according to one or more information combinations in the MIP parameter, and it is determined that the transform matrix includes selections of a transform set and a transform matrix group. Here, a certain transform matrix group in a certain transform set may be fixedly selected according to the MIP parameter, and there is no need to make a selection on the encoder side, and lfnst_idx does not need to be transmitted in this case, it is not necessary to select it on the encoder side or transmit lfnst_idx, and it is not necessary to parse the lfnst_idx bitstream on the decoder side.

Further, in some embodiments, when a prediction mode parameter indicates that a non-MIP mode is used for a current block, the method may further include: determining a value of predModeIntra based on an intra prediction mode; selecting one LFNST transform kernel candidate set from multiple LFNST transform kernel candidate sets according to the value of predModeIntra.

That is to say, if a prediction mode of the current block is a non-MIP mode, then a value of predModeIntra may be determined according to the intra prediction mode in this case. Then, according to the value of predModeIntra, and in combination with the above-mentioned Table 1 simultaneously, an LFNST transform kernel candidate set may be selected from multiple LFNST transform kernel candidate sets, and then a transform kernel indicated by an LFNST index is selected from the selected LFNST transform kernel candidate set and set as an LFNST transform kernel used for the current block.

S705: performing a transform processing on the transform coefficient by using the LFNST transform kernel.

It should be noted that after the LFNST transform kernel candidate set is selected, a value of an LFNST index (lfnst_idx) is obtained by parsing a bitstream. According to the value of lfnst_idx, a transform matrix (transform kernel) indicated by lfnst_idx may be selected from the LFNST transform kernel candidate set. For example, when lfnst_idx is 1, a first group of transform matrices may be used as an LFNST transform kernel in a decoding process, and when lfnst_idx is 2, a second group of transform matrices may be used as an LFNST transform kernel in a decoding process.

Further, for each group of transform matrices (transform kernels), basic transform matrices with two sizes are contained, and sizes of basic transform matrices used on a decoder side are 16×16 and 48×16. Selection is made according to nLfnstOutSzie. If nLfnstOutSzie is 16, a basic transform matrix of 16×16 is selected; or, if nLfnstOutSzie is 48, a basic transform matrix of 48×16 is selected. Or, if nonZeroSize is 8, only first eight rows in a transform matrix are used for matrix multiplication calculation.

Further, a secondary transform coefficient vector u[i] is taken as an input, and a transform matrix is multiplied by the u[i] to obtain a primary transform coefficient vector v[j], here, i=0, 1, . . . , nonZeroSize−1, j=0, 1, . . . , nLfnstOutSzie−1. It is assumed that a transform matrix obtained in a previous act is lowFreqTransMatrix, a specific calculation process of v[j] is as follows.

$$v[j] = \text{Clip3}\left(\text{CoeffMin}, \text{CoeffMax}, \left(\sum_{j=0}^{nonZeroSize-1} lowFreqTransMatrix[j][i] \times u[i] + 64\right) \gg 7\right) \quad (12)$$

Here, Clip3 serves for embedding, and a value of a coefficient may be limited between following two numbers, as shown below.

$$\text{CoeffMin} = -(1 \ll 15) \quad (13)$$

$$\text{CoeffMax} = (1 \ll 15) - 1 \quad (14)$$

In this way, after the above matrix calculation, a transform processing on a transform coefficient may be achieved. Here, for a 4×4 LFNST, on a decoder side, 16 or 8 coefficients will be input and 16 coefficients will be output. For an 8×8 LFNST, on the decoder side, 16 or 8 coefficients will be input and 48 coefficients will be output, so as to achieve an LFNST transform processing on transform coefficients.

In the embodiment of the present application, applicability of an LFNST technology to a current block using a MIP mode may be improved, so that selection of a transform set (or transform kernel) is more flexible. In an LFNST process of a current block using a MIP mode, related information of a MIP parameter is introduced, and characteristics of the current block are determined according to the MIP information, and then a transform set (or transform kernel) is selected. For example, this transform method is applied to VTM7.0, and tested under an All Intra condition at 24 frame intervals. Based on an average bit rate change under a same Peak Signal to Noise Ratio (PSNR), Bjøntegaard-Delta rate (BD-rate) changes of −0.03%, 0.00%, and −0.01% may be obtained on three colour components (namely Y, Cb, and Cr) respectively; especially on a large resolution sequence, there will be better performance. Specifically, on Class A1, a BD-rate change of −0.10% in Y may be achieved, thus improving a decoding efficiency.

This embodiment provides a transform method, in which a bitstream is parsed and a prediction mode parameter of a current block is determined; when the prediction mode parameter indicates that MIP is used for the current block to determine an intra prediction value, the bitstream is parsed and a MIP parameter is determined; the bitstream is parsed, and a transform coefficient of the current block and an LFNST index are determined; when the LFNST index indicates that an LFNST is used for the current block, an LFNST transform kernel used for the current block is determined according to the MIP parameter; a transform processing is performed on the transform coefficient by using the LFNST transform kernel. In this way, for the current block using the MIP mode, the MIP parameter is introduced during an LFNST transform, which makes selection of the LFNST transform kernel more flexible, thus not only applicability of the LFNST technology to a non-traditional intra prediction mode is improved, but also a decoding efficiency is improved, and at the same time, video picture quality can also be improved.

Figure 9:
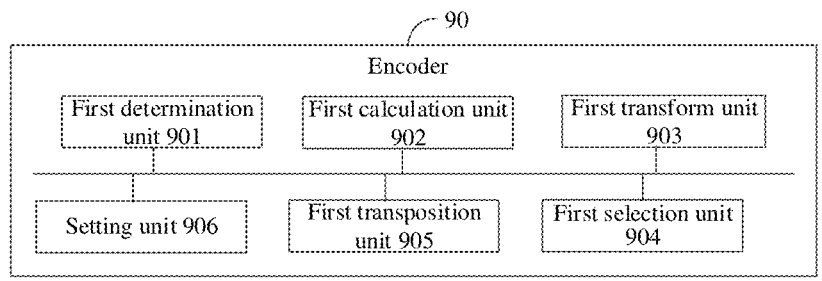
FIG. 9 is a schematic diagram of a structure of an encoder according to an embodiment of the present application.

Based on a same inventive concept as the foregoing embodiments, referring to FIG. 9, FIG. 9 shows a schematic diagram of a structure of an encoder 90 according to an embodiment of the present application. As shown in FIG. 9, the encoder 90 may include a first determination unit 901, a first calculation unit 902, and a first transform unit 903.

The first determination unit 901 is configured to determine a prediction mode parameter of a current block; the first determination unit 901 is further configured to determine a Matrix-based Intra Prediction (MIP) parameter when the prediction mode parameter indicates that MIP is used for the current block to determine an intra prediction value; the first calculation unit 902 is configured to determine the intra prediction value of the current block according to the MIP parameter and calculate a residual value between the current block and the intra prediction value; the first determination unit 901 is further configured to determine a Low-Frequency Non-Separable Transform (LFNST) transform kernel used for the current block according to the MIP parameter when an LFNST is used for the current block, set an LFNST index and signal it in a video bitstream; and the first transform unit 903 is configured to perform a transform processing on the residual value by using the LFNST transform kernel.

In the above solution, the MIP parameter includes a MIP transposition indication parameter, wherein a value of the MIP transposition indication parameter is used for indicating whether to perform a transposition processing on a sample input vector used in a MIP mode.

In the above solution, referring to FIG. 9, the encoder 90 may further include a first selection unit 904, a first transposition unit 905, and a setting unit 906.

The first selection unit 904 is configured to select a transform kernel used for the current block from an LFNST transform kernel candidate set; the first transposition unit 905 is configured to perform a matrix transposition processing on the selected transform kernel to obtain an LFNST transform kernel used for the current block when a value of the MIP transposition indication parameter indicates to perform a transposition processing on the sample input vector used in the MIP mode; and the setting unit 906 is configured to set a value of the LFNST index to indicate that an LFNST is used for the current block and an index of the LFNST transform kernel in the LFNST transform kernel candidate set, wherein the LFNST transform kernel candidate set contains two or more preset transform kernels used for MIP.

In the above solution, a MIP parameter includes a MIP mode index, wherein the MIP mode index is used for indicating a MIP mode used for the current block, and the MIP mode is used for indicating a calculation and derivation mode for determining an intra prediction value of the current block by using MIP.

In the above solution, the first determination unit 901 is further configured to determine a value of an LFNST intra prediction mode index according to a value of the MIP mode index; the first selection unit 904 is further configured to select one LFNST transform kernel candidate set from multiple LFNST transform kernel candidate sets according to the value of the LFNST intra prediction mode index; and select a transform kernel indicated by the LFNST index from the selected LFNST transform kernel candidate set and set the transform kernel as an LFNST transform kernel used for the current block; the setting unit 906 is configured to set a value of the LFNST index indicating that an LFNST is used for the current block and an index of the LFNST transform kernel in the LFNST transform kernel candidate set, wherein the LFNST transform kernel candidate set contains two or more preset LFNST transform kernels.

In the above solution, the first determination unit 901 is further configured to determine a value of the LFNST intra prediction mode index corresponding to the value of the MIP mode index by using a first look-up table, wherein the first look-up table at least contains one or more different MIP mode indices respectively corresponding to each of two LFNST intra prediction mode indices of different values.

In the above solution, the first selection unit 904 is further configured to select one LFNST transform kernel candidate set from multiple LFNST transform kernel candidate sets according to the value of the MIP mode index; and select a transform kernel indicated by the LFNST index from the selected LFNST transform kernel candidate set and set the transform kernel as an LFNST transform kernel used for the current block; the setting unit 906 is configured to set a value of the LFNST index to indicate that an LFNST is used for the current block and an index of the LFNST transform kernel in the LFNST transform kernel candidate set, wherein the LFNST transform kernel candidate set contains two or more preset LFNST transform kernels.

In the above solution, the first selection unit 904 is further configured to determine a value of an LFNST transform kernel candidate set index corresponding to the value of the MIP mode index by using a second look-up table, and select an LFNST transform kernel candidate set indicated by the value of the LFNST transform kernel candidate set index as the selected LFNST transform kernel candidate set, wherein the second look-up table at least contains one or more different MIP mode indices respectively corresponding to each of two LFNST transform kernel candidate set indices of different values.

In the above solution, the first calculation unit 902 is further configured to determine an LFNST transform kernel candidate set index by using a first calculation method according to the value of the MIP mode index; the first selection unit 904 is further configured to select an LFNST transform kernel candidate set indicated by the value of the LFNST transform kernel candidate set index as the selected LFNST transform kernel candidate set.

In the above solution, the first calculation unit 902 is specifically configured to set the value of the LFNST transform kernel candidate set index to be equal to the value of the MIP mode index when the value of the MIP mode index is less than a first preset value; and set the value of the LFNST transform kernel candidate set index to be equal to a difference value obtained by subtracting a second preset value from the value of the MIP mode index when the value of the MIP mode index is greater than or equal to the first preset value, wherein the first preset value and the second preset value are both integer values.

In the above solution, a value of the first preset value is equal to 3.

In the above solution, a value of the second preset value is equal to 2.

In the above solution, the MIP parameter also includes a MIP transposition indication parameter, wherein a value of the MIP transposition indication parameter is used for indicating whether to perform a transposition processing on the sample input vector used in the MIP mode; the first transposition unit 905 is further configured to perform a matrix transposition processing on the LFNST transform kernel used for the current block when the value of the MIP transposition indication parameter indicates to perform a transposition processing on the sample input vector used in the MIP mode, and set a transform kernel obtained after the transposition processing as the LFNST transform kernel used for the current block.

It may be understood that, in the embodiment of the present application, a "unit" may be a portion of a circuit, a portion of a processor, a portion of a program or software, etc.; it, of course, may be a module, or may be non-modular. In addition, various components in this embodiment may be integrated into one processing unit, or various units may exist physically separately, or two or more than two units may be integrated into one unit. The integrated units may be implemented in a form of hardware, or may be implemented in a form of a software functional module.

The integrated unit, if implemented in the form of a software functional module and sold or used as an independent product, may be stored in a computer readable storage medium. Based on such understanding, the technical solutions of the embodiment, in essence, or a part contributing to the prior art, or all or part of the technical solutions, may be embodied in a form of a software product, and the computer software product is stored in a storage medium, and includes several instructions for enabling a computer device (which may be a personal computer, a server, or a network device, etc.) or a processor to perform all or part of the acts of the methods in the embodiment. The aforementioned storage medium includes various media, such as a U disk, a mobile hard disk, a Read Only Memory (ROM), a Random Access Memory (RAM), a magnetic disk, or an optical disk, which are capable of storing program codes.

Therefore, an embodiment of the present application provides a computer storage medium applied to the encoder 90. The computer storage medium stores a transform program, and when the transform program is executed by a first processor, the method according to any one of the aforementioned embodiments is implemented.

Figure 10:
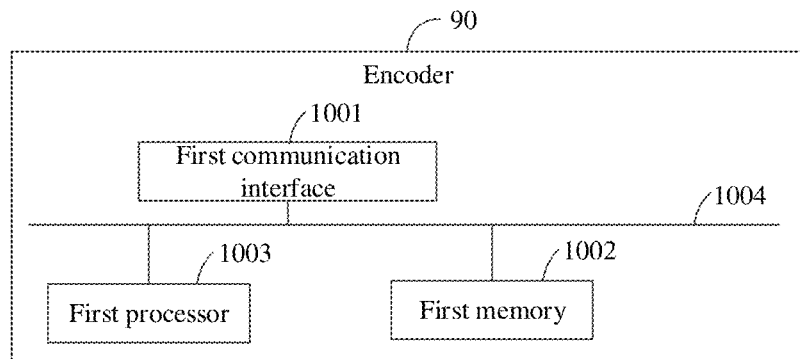
FIG. 10 is a schematic diagram of a specific hardware structure of an encoder according to an embodiment of the present application.

Based on the composition of the encoder 90 and the computer storage medium described above, referring to FIG. 10, FIG. 10 shows an example of a specific hardware structure of an encoder 90 according to an embodiment of the present application, which may include a first communication interface 1001, a first memory 1002, and a first processor 1003 coupled together through a first bus system 1004. It may be understood that the first bus system 1004 is used for implementing connection and communication between these components. In addition to including data buses, the first bus system 1004 further includes power buses, control buses, and status signal buses. However, for the sake of clarity, various buses are all labeled as the first bus system 1004 in FIG. 10.

Herein, the first communication interface 1001 is configured to receive and send signals during reception and transmission of information from and to other external network elements.

The first memory 1002 is configured to store a computer program runnable on the first processor 1003.

The first processor 1003 is configured to, when running the computer program, determine a prediction mode parameter of a current block; determine a Matrix-based Intra Prediction (MIP) parameter when the prediction mode parameter indicates that MIP is used for the current block to determine an intra prediction value; determine an intra prediction value of the current block according to the MIP parameter and calculate a residual value between the current block and the intra prediction value; determine a Low-Frequency Non-Separable Transform (LFNST) transform kernel used for the current block according to the MIP parameter when an LFNST is used for the current block, and set an LFNST index and signal it in a video bitstream; and perform a transform processing on the residual value by using the LFNST transform kernel.

It may be understood that the first memory 1002 in the embodiment of the present application may be a volatile memory or a non-volatile memory, or may include both a volatile memory and a non-volatile memory. Herein, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. Through exemplary but non-restrictive description, many forms of RAMs may be available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a SynchLink Dynamic Random Access Memory (SLDRAM), and a Direct Rambus Random Access Memory (DRRAM). The first memory 1002 in the systems and methods described in the present application is intended to include, but not be limited to, these and any other suitable types of memories.

The first processor 1003 may be an integrated circuit chip having a signal processing capability. In an implementation process, each of the acts of the foregoing methods may be completed through an integrated logic circuit of hardware in the first processor 1003 or instructions in a form of software. The first processor 1003 described above may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement various methods, acts, and logic block diagrams disclosed in the embodiments of the present application. The general purpose processor may be a microprocessor or the processor may be any conventional processor or the like. The acts of the methods disclosed in connection with the embodiments of the present application may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in the first memory 1002, and the first processor 1003 reads information in the first memory 1002 and completes the acts of the foregoing methods in combination with its hardware.

It may be understood that these embodiments described in the present application may be implemented by hardware, software, firmware, middleware, microcode, or a combination thereof. For the implementation by hardware, a processing unit may be implemented in one or more application specific integrated circuits (ASICs), digital signal processors (DSPs), DSP Devices (DSPDs), programmable logic devices (PLDs), field programmable gate arrays (FPGAs), general purpose processors, controllers, microcontrollers, microprocessors, other electronic modules for performing the functions described in the present application, or combinations thereof. For an implementation by software, techniques described in the present application may be implemented through modules (e.g., processes, functions) that perform the functions described in the present application. Software codes may be stored in a memory and executed by a processor. The memory may be implemented in the processor or external to the processor.

Optionally, as another embodiment, the first processor 1003 is further configured to perform the method according to any one of the aforementioned embodiments when running the computer program.

This embodiment provides an encoder, which may include a first determination unit, a first calculation unit, and a first transform unit. In this way, for the current block using the MIP mode, the MIP parameter is introduced during an LFNST transform, which makes selection of the LFNST transform kernel more flexible, thus not only applicability of the LFNST technology to a non-traditional intra prediction mode is improved, but also an encoding efficiency is improved, and at the same time, video picture quality can also be improved.

Figure 11:
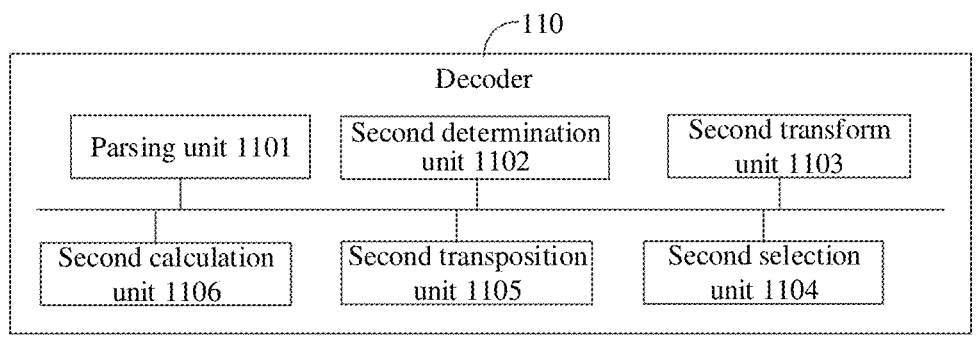
FIG. 11 is a schematic diagram of a structure of a decoder according to an embodiment of the present application.

Based on a same inventive concept as the foregoing embodiments, referring to FIG. 11, FIG. 11 shows a schematic diagram of a structure of a decoder 110 according to an embodiment of the present application. As shown in FIG. 11, the decoder 110 may include a parsing unit 1101, a second determination unit 1102, and a second transform unit 1103.

The parsing unit 1101 is configured to parse a bitstream and determine a prediction mode parameter of a current block; and is further configured to parse the bitstream and determine a MIP parameter when the prediction mode parameter indicates that MIP is used for the current block to determine an intra prediction value; and is further configured to parse the bitstream and determine a transform coefficient of the current block and an LFNST index; the second determination unit 1102 is configured to determine an LFNST transform kernel used for the current block according to the MIP parameter when the LFNST index indicates that an LFNST is used for the current block; and the second transform unit 1103 is configured to perform a transform processing on the transform coefficient by using the LFNST transform kernel.

In the above solution, the MIP parameter includes a MIP transposition indication parameter, wherein a value of the MIP transposition indication parameter is used for indicating whether to perform a transposition processing on a sample input vector used in a MIP mode.

In the above solution, referring to FIG. 11, the decoder 110 may further include a second selection unit 1104 and a second transposition unit 1105.

The second selecting unit 1104 is configured to select a transform kernel indicated by the LFNST index from an LFNST transform kernel candidate set; the second transposition unit 1105 is configured to perform a matrix transposition processing on the selected transform kernel to obtain an LFNST transform kernel used for the current block when the value of the MIP transposition indication parameter indicates to perform a transposition processing on the sample input vector used in the MIP mode, wherein the LFNST transform kernel candidate set contains two or more preset transform kernels used for MIP.

In the above solution, a MIP parameter includes a MIP mode index, wherein the MIP mode index is used for indicating a MIP mode used for the current block, and the MIP mode is used for indicating a calculation and derivation mode for determining an intra prediction value of the current block by using MIP.

In the above solution, the second determination unit 1102 is further configured to determine a value of an LFNST intra prediction mode index according to a value of the MIP mode index; the second selection unit 1104 is further configured to select one LFNST transform kernel candidate set from multiple LFNST transform kernel candidate sets according to the value of the LFNST intra prediction mode index; and select a transform kernel indicated by the LFNST index from the selected LFNST transform kernel candidate set and set the transform kernel as an LFNST transform kernel used for the current block, wherein the LFNST transform kernel candidate set contains two or more preset LFNST transform kernels.

In the above solution, the second determination unit 1102 is further configured to determine a value of the LFNST intra prediction mode index corresponding to the value of the MIP mode index by using a first look-up table, wherein the first look-up table at least contains one or more different MIP mode indices respectively corresponding to each of two LFNST intra prediction mode indices of different values.

In the above solution, the second selection unit 1104 is further configured to select one LFNST transform kernel candidate set from multiple LFNST transform kernel candidate sets according to the value of the MIP mode index, and select a transform kernel indicated by the LFNST index from the selected LFNST transform kernel candidate set and set the transform kernel as an LFNST transform kernel used for the current block, wherein the LFNST transform kernel candidate set contains two or more preset LFNST transform kernels.

In the above solution, the second selection unit 1104 is further configured to determine a value of an LFNST transform kernel candidate set index corresponding to the value of the MIP mode index by using a second look-up table, and select an LFNST transform kernel candidate set indicated by the value of the LFNST transform kernel candidate set index as the selected LFNST transform kernel candidate set; wherein, the second look-up table at least contains one or more different MIP mode indices correspondingly respectively to each of two LFNST transform kernel candidate set indices of different values.

In the above solution, referring to FIG. 11, the decoder 110 may further include a second calculation unit 1106, which is configured to determine an LFNST transform kernel candidate set index by using a first calculation method according to the value of the MIP mode index; the second selection unit 1104 is further configured to select an LFNST transform kernel candidate set indicated by a value of the LFNST transform kernel candidate set index as the selected LFNST transform kernel candidate set.

In the above solution, the second calculation unit 1106 is specifically configured to set a value of the LFNST transform kernel candidate set index to be equal to the value of the MIP mode index when the value of the MIP mode index is less than a first preset value; and set a value of the LFNST transform kernel candidate set index to be equal to a difference value obtained by subtracting a second preset value from the value of the MIP mode index when the value of the MIP mode index is greater than or equal to the first preset value; wherein the first preset value and the second preset value are both integer values.

In the above solution, a value of the first preset value is equal to 3.

In the above solution, a value of the second preset value is equal to 2.

In the above solution, the MIP parameter also includes a MIP transposition indication parameter, wherein a value of the MIP transposition indication parameter indicates whether to perform a transposition processing on a sample input vector used in a MIP mode; the second transposition unit 1105 is further configured to perform a matrix transposition processing on the LFNST transform kernel used for the current block when the value of the MIP transposition indication parameter indicates to perform a transposition processing on the sample input vector used in the MIP mode, and set a transform kernel obtained after the transposition processing as an LFNST transform kernel used for the current block.

It may be understood that, in embodiments of the present application, in this embodiment, a "unit" may be a portion of a circuit, a portion of a processor, a portion of a program or software, etc., or, of course, may be a module, or may be non-modular. In addition, various components in this embodiment may be integrated into one processing unit, or various units may exist physically separately, or two or more than two units may be integrated into one unit. The integrated units may be implemented in a form of hardware, or may be implemented in a form of a software functional module. The integrated unit, if implemented in a form of a software functional module and sold or used as an independent product, may be stored in a computer-readable storage medium.

Therefore, an embodiment of the present application provides a computer storage medium applied to the decoder 110. The computer storage medium stores a transform program, and when the transform program is executed by a second processor, the method according to any one of the aforementioned embodiments is implemented.

Figure 12:
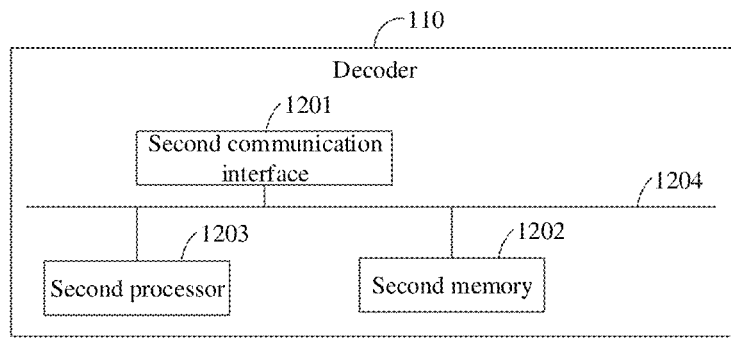
FIG. 12 is a schematic diagram of a specific hardware structure of a decoder according to an embodiment of the present application.

Based on the composition of the decoder 110 and the computer storage medium described above, referring to FIG. 12, which shows a specific hardware structure of a decoder 110 according to an embodiment of the present application. The decoder 100 may include a second communication interface 1201, a second memory 1202, and a second processor 1203 coupled together through a second bus system 1204. It may be understood that the second bus system 1204 is used for implementing connection and communication between these components. In addition to including data buses, the second bus system 1204 further includes power buses, control buses, and status signal buses. However, for the sake of clarity, various buses are all labeled as the second bus system 1204 in FIG. 12.

Herein, the second communication interface 1201 is configured to receive and send signals during reception and transmission of information from and to other external network elements.

The second memory 1202 is configured to store a computer program runnable on the second processor 1203.

The second processor 1203 is configured to, when running the computer program, parsing a bitstream and determining a prediction mode parameter of a current block; parsing the bitstream and determining a Matrix-based Intra Prediction (MIP) parameter when the prediction mode parameter indicates that MIP is used for the current block to determine an intra prediction value; parsing the bitstream and determining a transform coefficient of the current block and an LFNST index; determining an LFNST transform kernel used for the current block according to a MIP parameter when the LFNST index indicates that an LFNST is used for the current block; and performing a transform processing on the transform coefficient by using the LFNST transform kernel.

Optionally, as another embodiment, the second processor 1203 is further configured to perform the method according to any one of the aforementioned embodiments when running the computer program.

It may be understood that hardware functions of the second memory 1202 are similar to those of the first memory 1002 and hardware functions of the second processor 1203 are similar to those of the first processor 1003, which will not be repeated here.

This embodiment provides a decoder, which may include a parsing unit, a second determination unit, and a second transform unit. In this way, for the current block using the MIP mode, the MIP parameter is introduced during an LFNST transform, which makes the selection of the LFNST transform kernel more flexible, thus not only applicability of the LFNST technology to a non-traditional intra prediction mode is improved, but also a decoding efficiency is improved, and at the same time, video picture quality can also be improved.

It should be noted that in the present application, the terms "include", "contain" or any other variations thereof are intended to cover a non-exclusive inclusion, such that a process, method, article, or apparatus that includes a series of elements includes not only those elements but also other elements which are not expressly listed, or further includes elements inherent to such a process, method, article, or apparatus. An element defined by a statement "include one" does not exclude presence of additional identical elements in a process, method, article, or apparatus that includes the element, without more limitations.

The above-mentioned serial numbers of the embodiments of the present application are only for description, and do not represent superiority and inferiority of the embodiments.

The methods disclosed in several method embodiments provided in the present application may be combined with each other randomly if there is no conflict, to obtain new method embodiments.

Features disclosed in several product embodiments provided in the present application may be combined with each other randomly if there is no conflict, to obtain new product embodiments.

Features disclosed in several method or device embodiments provided in the present application may be combined with each other randomly if there is no conflict, to obtain new method embodiments or device embodiments.

The foregoing are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

INDUSTRIAL APPLICABILITY

In the embodiments of present application, firstly, a prediction mode parameter of a current block is determined; a Matrix-based Intra Prediction (MIP) parameter is determined when the prediction mode parameter indicates that MIP is used for the current block to determine an intra prediction value; then the intra prediction value of the current block is determined according to the MIP parameter, and a residual value between the current block and the intra prediction value is calculated; when a Low-Frequency Non-Separable Transform (LFNST) is used for the current block, an LFNST transform kernel used for the current block is determined according to the MIP parameter, an LFNST index is set and signalled in a video bitstream; and finally a transform processing is performed on the residual value by using the LFNST transform kernel. In this way, for the current block using the MIP mode, the MIP parameter is introduced during an LFNST transform, which makes selection of the LFNST transform kernel more flexible, thus not only applicability of the LFNST technology to a non-traditional intra prediction mode is improved, but also encoding and decoding efficiencies are improved, and at the same time, video picture quality can also be improved.

What is claimed is:

1. A transform method, applied to an encoder, the method comprising:
   determining a prediction mode parameter of a current block;
   determining a Matrix-based Intra Prediction (MIP) parameter when the prediction mode parameter indicates that MIP is used for the current block to determine an intra prediction value;
   determining an intra prediction value of the current block according to the MIP parameter and calculating a residual value between the current block and the intra prediction value;
   determining a Low-Frequency Non-Separable Transform (LFNST) transform kernel used for the current block according to the MIP parameter when an LFNST is used for the current block, setting an LFNST index, and signalling the LFNST index in a video bitstream; and
   performing a transform processing on the residual value by using the LFNST transform kernel;
   wherein the MIP parameter comprises a MIP mode index, the MIP mode index is used for indicating a MIP mode used for the current block, and the MIP mode is used for indicating a calculation and derivation mode for determining the intra prediction value of the current block by using MIP; wherein different MIP modes have different MIP mode indices;
   wherein determining the LFNST transform kernel used for the current block according to the MIP parameter when the LFNST is used for the current block comprises:
   determining a value of an LFNST intra prediction mode index according to a value of the MIP mode index, and selecting one LFNST transform kernel candidate set from a plurality of LFNST transform kernel candidate sets according to the value of the LFNST intra prediction mode index; or,
   selecting one LFNST transform kernel candidate set from a plurality of LFNST transform kernel candidate sets according to a value of the MIP mode index;
   wherein the LFNST transform kernel candidate set contains two or more preset LFNST transform kernels.

2. The method of claim 1, wherein determining the LFNST transform kernel used for the current block according to the MIP parameter when the LFNST is used for the current block further comprises:
   selecting a transform kernel indicated by the LFNST index from the selected LFNST transform kernel candidate set and setting the transform kernel as the LFNST transform kernel used for the current block;
   wherein setting the LFNST index, and signalling the LFNST index in the video bitstream comprises:
   setting a value of the LFNST index to indicate that the LFNST is used for the current block and an index of the LFNST transform kernel in the LFNST transform kernel candidate set.

3. The method of claim 2, wherein determining the value of the LFNST intra prediction mode index according to the value of the MIP mode index comprises:
   determining a value of the LFNST intra prediction mode index corresponding to the value of the MIP mode index by using a first look-up table, wherein the first look-up table at least contains one or more different MIP mode indices respectively corresponding to each of two LFNST intra prediction mode indices of different values.

4. The method of claim 2, wherein selecting one LFNST transform kernel candidate set from the plurality of LFNST transform kernel candidate sets according to the value of the MIP mode index comprises:
   determining a value of an LFNST transform kernel candidate set index corresponding to the value of the MIP mode index by using a second look-up table, and selecting an LFNST transform kernel candidate set indicated by the value of the LFNST transform kernel candidate set index as the selected LFNST transform kernel candidate set;
   wherein the second look-up table at least contains one or more different MIP mode indices respectively corresponding to each of two LFNST transform kernel candidate set indices of different values.

5. The method of claim 2, wherein selecting one LFNST transform kernel candidate set from the plurality of LFNST transform kernel candidate sets according to the value of the MIP mode index comprises:
   determining an LFNST transform kernel candidate set index by using a first calculation method according to the value of the MIP mode index; and
   selecting an LFNST transform kernel candidate set indicated by a value of the LFNST transform kernel candidate set index as the selected LFNST transform kernel candidate set.

6. A transform method, applied to a decoder, the method comprising:
   parsing a bitstream and determining a prediction mode parameter of a current block;
   parsing the bitstream and determining a Matrix-based Intra Prediction (MIP) parameter when the prediction mode parameter indicates that MIP is used for the current block to determine an intra prediction value;
   parsing the bitstream and determining a Low-Frequency Non-Separable Transform (LFNST) index and a transform coefficient of the current block;
   determining an LFNST transform kernel used for the current block according to the MIP parameter when the LFNST index indicates that an LFNST is used for the current block; and
   performing a transform processing on the transform coefficient by using the LFNST transform kernel;
   wherein the MIP parameter comprises a MIP mode index, the MIP mode index is used for indicating a MIP mode used for the current block, and the MIP mode is used for indicating a calculation and derivation mode for determining the intra prediction value of the current block by using MIP; wherein different MIP modes have different MIP mode indices;
   wherein determining the LFNST transform kernel used for the current block according to the MIP parameter when the LFNST index indicates that the LFNST is used for the current block comprises:
  determining a value of an LFNST intra prediction mode index according to a value of the MIP mode index, and selecting one LFNST transform kernel candidate set from a plurality of LFNST transform kernel candidate sets according to the value of the LFNST intra prediction mode index; or
  selecting one LFNST transform kernel candidate set from a plurality of LFNST transform kernel candidate sets according to a value of the MIP mode index;
  wherein the LFNST transform kernel candidate set contains two or more preset LFNST transform kernels.

7. The method of claim 6, wherein determining the LFNST transform kernel used for the current block according to the MIP parameter when the LFNST index indicates that the LFNST is used for the current block further comprises:
  selecting a transform kernel indicated by the LFNST index from the selected LFNST transform kernel candidate set and setting the transform kernel as the LFNST transform kernel used for the current block.

8. The method of claim 7, wherein determining the value of the LFNST intra prediction mode index according to the value of the MIP mode index comprises:
  determining a value of the LFNST intra prediction mode index corresponding to the value of the MIP mode index by using a first look-up table, wherein the first look-up table at least contains one or more different MIP mode indices respectively corresponding to each of two LFNST intra prediction mode indices of different values.

9. The method of claim 7, wherein selecting one LFNST transform kernel candidate set from the plurality of LFNST transform kernel candidate sets according to the value of the MIP mode index comprises:
  determining a value of an LFNST transform kernel candidate set index corresponding to the value of the MIP mode index by using a second look-up table, and selecting an LFNST transform kernel candidate set indicated by the value of the LFNST transform kernel candidate set index as the selected LFNST transform kernel candidate set;
  wherein the second look-up table at least contains one or more different MIP mode indices respectively corresponding to each of two LFNST transform kernel candidate set indices of different values.

10. The method of claim 7, wherein selecting one LFNST transform kernel candidate set from the plurality of LFNST transform kernel candidate sets according to the value of the MIP mode index comprises:
  determining an LFNST transform kernel candidate set index by using a first calculation method according to the value of the MIP mode index; and
  selecting an LFNST transform kernel candidate set indicated by a value of the LFNST transform kernel candidate set index as the selected LFNST transform kernel candidate set.

11. The method of claim 10, wherein determining the LFNST transform kernel candidate set index by using the first calculation method according to the value of the MIP mode index comprises:
  setting a value of the LFNST transform kernel candidate set index to be equal to the value of the MIP mode index when the value of the MIP mode index is less than a first preset value; and
  setting a value of the LFNST transform kernel candidate set index to be equal to a difference value obtained by subtracting a second preset value from the value of the MIP mode index when the value of the MIP mode index is greater than or equal to the first preset value;
  wherein the first preset value and the second preset value are both integer values.

12. A decoder comprising a memory and a processor, wherein
  the memory is configured to store a computer program executable by the processor; and
  the processor is configured to perform following operations when executing the computer program:
  parsing a bitstream and determining a prediction mode parameter of a current block;
  parsing the bitstream and determining a Matrix-based Intra Prediction (MIP) parameter when the prediction mode parameter indicates that MIP is used for the current block to determine an intra prediction value;
  parsing the bitstream and determining a Low-Frequency Non-Separable Transform (LFNST) index and a transform coefficient of the current block;
  determining an LFNST transform kernel used for the current block according to the MIP parameter when the LFNST index indicates that an LFNST is used for the current block; and
  performing a transform processing on the transform coefficient by using the LFNST transform kernel;
  wherein the MIP parameter comprises a MIP mode index, the MIP mode index is used for indicating a MIP mode used for the current block, and the MIP mode is used for indicating a calculation and derivation mode for determining the intra prediction value of the current block by using MIP; wherein different MIP modes have different MIP mode indices;
  wherein determining the LFNST transform kernel used for the current block according to the MIP parameter when the LFNST index indicates that the LFNST is used for the current block comprises:
  determining a value of an LFNST intra prediction mode index according to a value of the MIP mode index, and selecting one LFNST transform kernel candidate set from a plurality of LFNST transform kernel candidate sets according to the value of the LFNST intra prediction mode index; or
  selecting one LFNST transform kernel candidate set from a plurality of LFNST transform kernel candidate sets according to a value of the MIP mode index;
  wherein the LFNST transform kernel candidate set contains two or more preset LFNST transform kernels.

* * * * *